(12) United States Patent
Yokoyama et al.

(10) Patent No.: US 12,314,473 B2
(45) Date of Patent: May 27, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Ryo Yokoyama, Tokyo (JP); Ikuo Yamano, Tokyo (JP); Tsuyoshi Ishikawa, Kanagawa (JP); Shin Shiroma, Tokyo (JP); Keijiroh Nagano, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/285,592

(22) PCT Filed: Jan. 27, 2022

(86) PCT No.: PCT/JP2022/003004
§ 371 (c)(1),
(2) Date: Oct. 4, 2023

(87) PCT Pub. No.: WO2022/230264
PCT Pub. Date: Nov. 3, 2022

(65) Prior Publication Data
US 2024/0184368 A1  Jun. 6, 2024

(30) Foreign Application Priority Data
Apr. 26, 2021  (JP) ................. 2021-073746

(51) Int. Cl.
*G06F 3/01* (2006.01)
*G06T 19/20* (2011.01)

(52) U.S. Cl.
CPC .............. *G06F 3/016* (2013.01); *G06F 3/011* (2013.01); *G06T 19/20* (2013.01); *G06T 2219/2012* (2013.01); *G06T 2219/2016* (2013.01)

(58) Field of Classification Search
CPC .......... A63F 13/65; A63F 13/30; A63F 13/57; A63F 13/812; G06T 7/20; G06T 15/40;
(Continued)

(56) References Cited

U.S. PATENT DOCUMENTS

| 6,125,385 | A | * | 9/2000 | Wies | ................... G06F 3/03543 709/217 |
| 2007/0216644 | A1 | * | 9/2007 | Nam | ..................... G06F 3/0321 345/158 |
| 2012/0038549 | A1 | * | 2/2012 | Mandella | ................ G06F 3/011 345/156 |

FOREIGN PATENT DOCUMENTS

| JP | 2011-096171 A | 5/2011 |
| JP | 2011-248443 A | 12/2011 |

(Continued)

*Primary Examiner* — Shaheda A Abdin
(74) *Attorney, Agent, or Firm* — Paratus Law Group, PLLC

(57) ABSTRACT

There is provided an information processing apparatus, an information processing method, and a program capable of displaying an effect image indicating a situation of tactile presentation caused by an object. The information processing apparatus according to one aspect of the present technology acquires information regarding a situation of tactile presentation to at least a part of a user's body, and generates an effect image indicating the situation of the tactile presentation. The present technology can be applied to, for example, a transmissive head-mounted display (HMD).

18 Claims, 24 Drawing Sheets

(58) Field of Classification Search
CPC ........... G06T 9/00; G06T 13/40; G06T 15/04; G06T 2215/16; G06T 2200/08; G06T 2200/04
See application file for complete search history.

(56) References Cited

FOREIGN PATENT DOCUMENTS

| | | |
|---|---|---|
| JP | 2017-063916 A | 4/2017 |
| WO | WO 2019/244716 A1 | 12/2019 |

* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/003004 (filed on Jan. 27, 2022) under 35 U.S.C. § 371, which claims priority to Japanese Patent Application No. 2021-073746 (filed on Apr. 26, 2021), which are all hereby incorporated by reference in their entirety.

TECHNICAL FIELD

The present technology relates to an information processing apparatus, an information processing method, and a program, and more particularly, to an information processing apparatus, an information processing method, and a program capable of displaying an effect image for enhancing an effect of tactile presentation in an interaction between a user and an object.

BACKGROUND ART

In recent years, various types of augmented reality (AR) controllers have been developed. By using the AR controller in combination with a display device such as an AR head-mounted display (HMD) that displays a virtual object, the user can perceive tactile presentation corresponding to the interaction between the virtual object and the user's body via the AR controller while observing the virtual object.

For example, Patent Document 1 discloses a tactile presentation device to be worn on a user's hand. The tactile presentation device is configured to perform tactile presentation to the user's palm or fingertip according to the display of the virtual object on the AR HMD.

CITATION LIST

Patent Document

Patent Document 1: WO 2019/244716

SUMMARY OF THE INVENTION

Problems to be Solved by the Invention

In a case where feedback to the user by the interaction between the object and the user's body as described above is performed using only tactile presentation, it is difficult for the user to perceive what positional relationship between the object and the user has caused the tactile presentation.

The present technology has been performed in view of such a situation, and makes it possible to display an effect image indicating a situation of tactile presentation caused by an object.

Solutions to Problems

An information processing apparatus according to one aspect of the present technology includes a control unit that acquires information regarding tactile presentation to at least a part of a user's body, and generates an effect image indicating the situation of the tactile presentation.

In another aspect of the present technology, information regarding a situation of tactile presentation to at least a part of a user's body is acquired, and an effect image indicating the situation of the tactile presentation is generated.

MODE FOR CARRYING OUT THE INVENTION

Hereinafter, modes for carrying out the present technology will be described. The description will be given in the following order.

1. Configuration of information processing system
2. First embodiment (example of effect image corresponding to distance and movement of virtual object)
3. System configuration
4. Flow of each processing
5. Second Embodiment (example of effect image corresponding to pressure value)
6. Third Embodiment (example of effect image corresponding to movement of virtual object related to real object)
7. Fourth Embodiment (example of effect image corresponding to movement of plurality of virtual objects)
8. Fifth Embodiment (example of stereoscopic effect)
9. Sixth Embodiment (example of effect image indicating vibration presentation outside range of viewing angle of display unit)

10. Modification 1 (example of effect image in pinching action)
11. Modification 2 (example of effect image during interaction with real object)
12. Modification 3 (example of pressure-sensitive display)
13. Another configuration example of information processing system according to one embodiment
14. Another configuration example of each apparatus <<Configuration of Information Processing System>>

Figure 1:
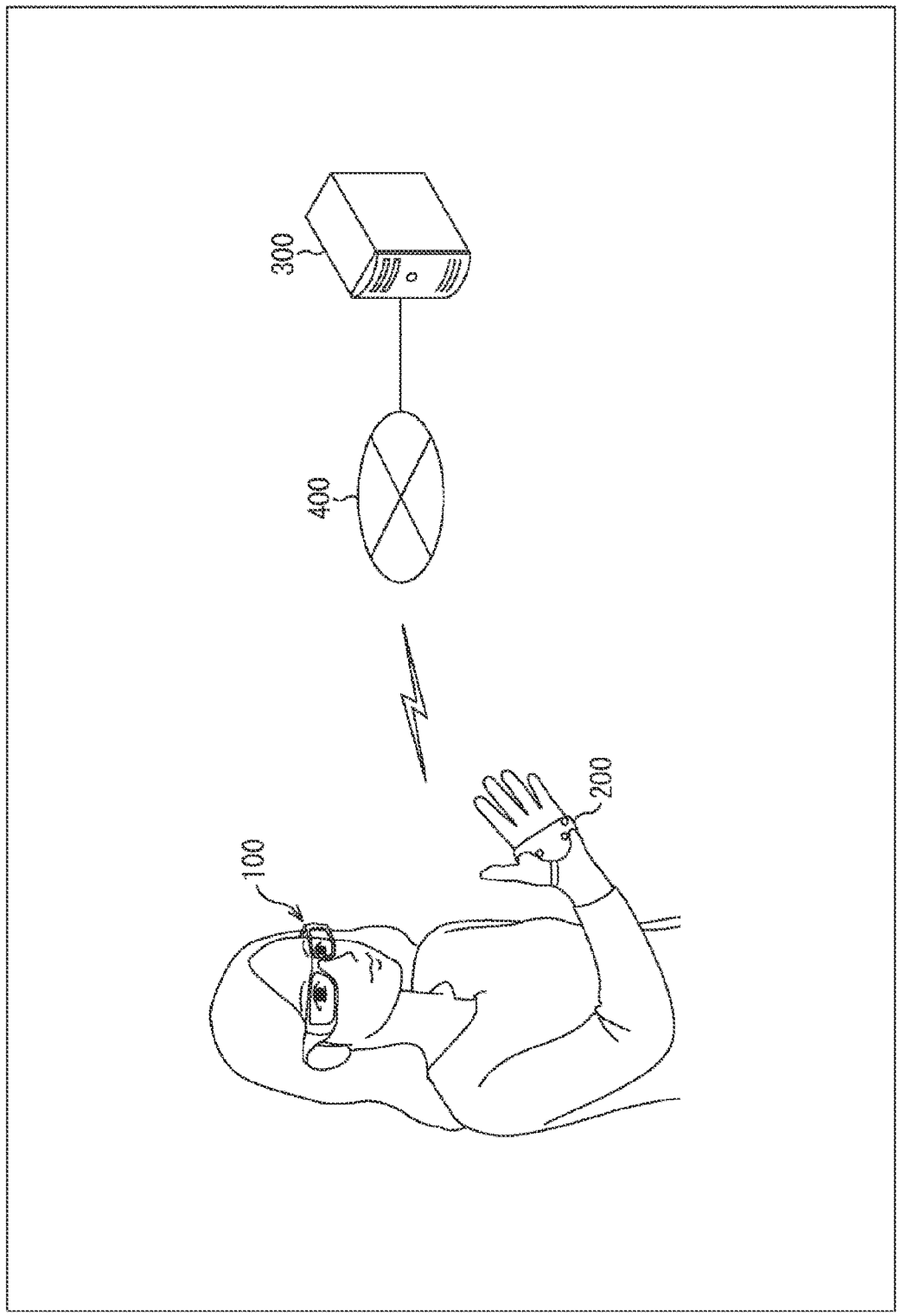
FIG. 1 is a diagram illustrating a configuration example of an information processing system according to one embodiment of the present technology.

FIG. 1 is a diagram illustrating a configuration example of an information processing system according to one embodiment of the present technology.

The information processing system in FIG. 1 includes an AR HMD 100, a tactile presentation device 200, and an information processing apparatus 300. The AR HMD 100 and the tactile presentation device 200, which are user-side devices, are connected by wireless communication such as Bluetooth (registered trademark) or via a wired cable. The AR HMD 100 and the information processing apparatus 300 are connected via a network 400 such as a local area network (LAN) or the Internet.

As illustrated in FIG. 1, the AR HMD 100 is a glasses-type wearable terminal including a transmissive display unit. The AR HMD 100 displays a virtual object on the display unit on the basis of content information acquired from the information processing apparatus 300 via the network 400. The user sees the virtual object on the transmissive display unit, superimposed onto the real space Furthermore, as will be described in detail later, the AR HMD 100 displays an effect image indicating a situation of tactile presentation caused by an object. The object may be a real object existing in the real space or a virtual object displayed on the AR HMD 100. The tactile presentation means presenting a tactile stimulus to the user's body from the tactile presentation device 200 fixed to the user's body. The situation of the tactile presentation is a situation in which the tactile presentation is performed from the tactile presentation device 200 to the user's body. The tactile presentation is performed with any intensity, position, and timing.

The AR HMD 100 may be replaced with another display apparatus as long as the display apparatus can display a virtual object. For example, the virtual object may be displayed by any display apparatus of a head-mounted type, a smartphone type, a tablet type, and a stationary type (a television, a face-to-face display, etc.). In the case of a head-mounted display apparatus, an AR HMD with an imaginary image projection or retinal projection system, or a virtual reality (VR) HMD may be used.

The tactile presentation device 200 is a so-called AR controller worn on the body, such as the palm, of the user. The user can interact with the virtual object by wearing the tactile presentation device 200 and moving his or her hand or finger.

The tactile presentation device 200 performs tactile presentation to the user. The tactile presentation to the user occurs in response to the interaction between the object and the user's body. The tactile presentation may be performed on a position determined by the interaction between the tactile presentation device 200 and the object, or may be performed on a position determined on the basis of the position of the user's body specified by bone estimation.

The information processing apparatus 300 stores content related to the virtual object to be displayed on the AR HMD 100, and transmits content information to the AR HMD 100 via the network 400.

Figure 2:
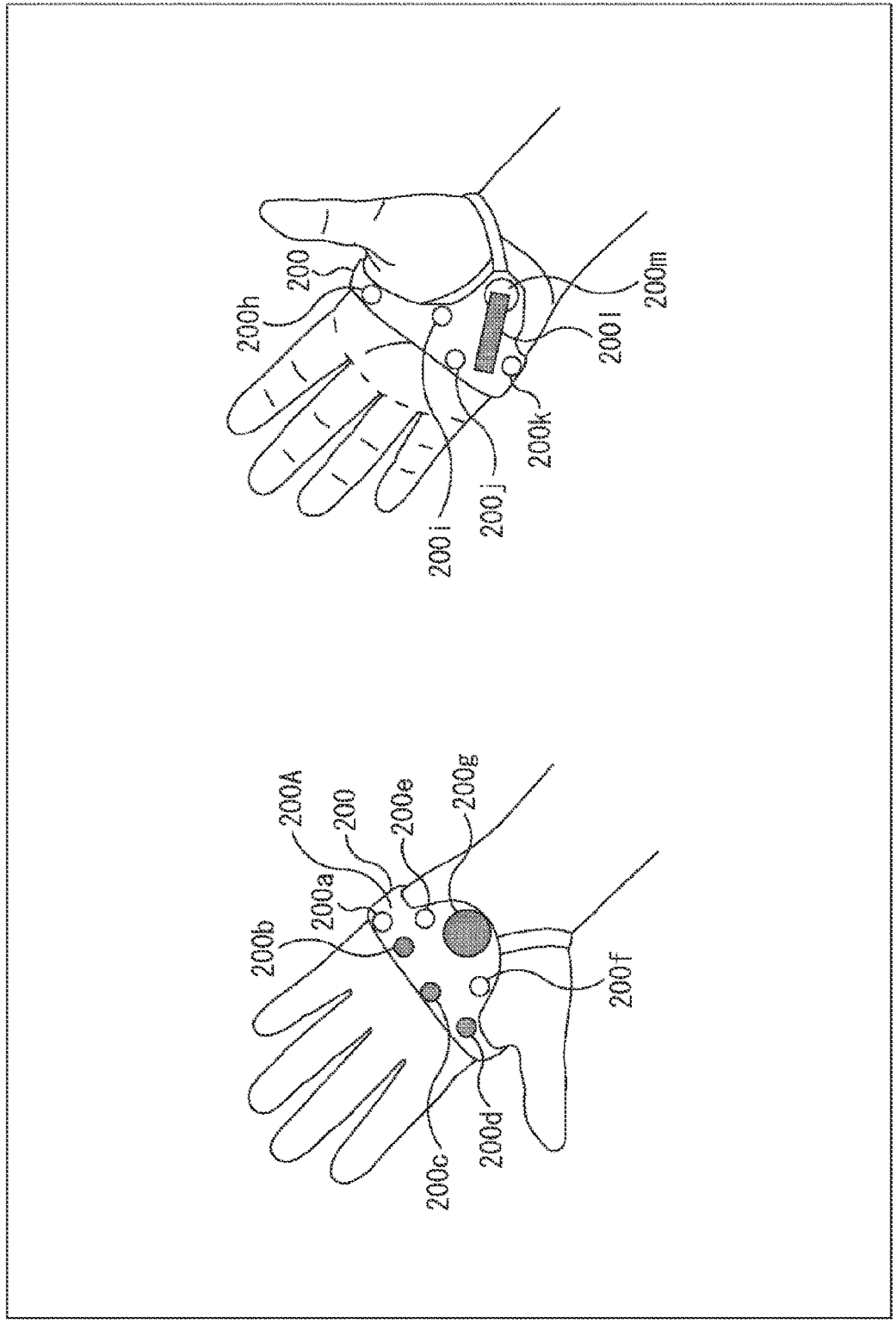
FIG. 2 is a diagram illustrating an example of a tactile presentation device.

FIG. 2 is a diagram illustrating the appearance of the tactile presentation device 200.

As illustrated in FIG. 2, the tactile presentation device 200 is fixed to the user's hand so as to cover the back and palm portions of the hand with a body portion 200A that is made using a flexible material. A member with a large width near the center of each of the back and palm portions constitutes the body portion 200A.

As illustrated on the left side of FIG. 2, tactile presentation mechanisms 200a to 200g are provided at arbitrary positions on the body portion 200A on the back side of the hand. Furthermore, as illustrated on the right side of FIG. 2, tactile presentation mechanisms 200h to 200m are provided at arbitrary positions on the body portion 200A on the palm side.

The tactile presentation mechanisms 200a to 200m include, for example, a device such as an actuator that generates vibration. By switching the tactile presentation mechanism that generates vibration or switching the intensity and pattern of vibration, it is possible to provide various sensations at different positions on the user's hand such as the center of the palm, the center of the back, and the fingertip.

The number of tactile presentation mechanisms 200a to 200m is not particularly limited, and may be one or more.

The tactile presentation device 200 may be worn at an arbitrary position of the user's body, such as the head, the arm, the abdomen, the leg, and the fingertip, in addition to the back of the hand and the palm as illustrated in FIG. 2.

Figure 3:
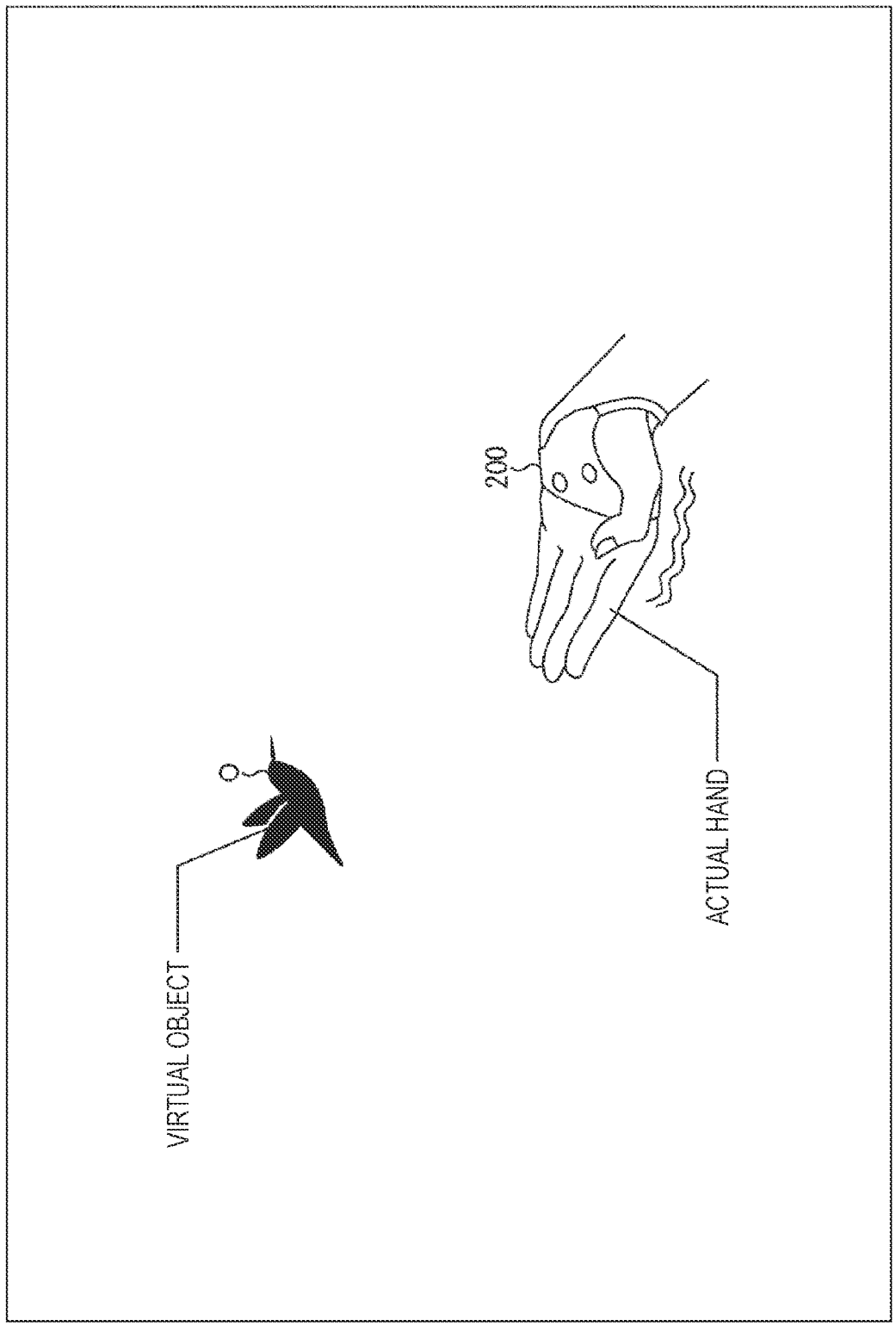
FIG. 3 is a diagram illustrating an example of an actual scene.

FIG. 3 is a diagram illustrating an example of the interaction between the virtual object and the user's body.

FIG. 3 illustrates an action of putting out the palm toward a virtual object O that represents a bird approaching the user's hand. The virtual object O is a virtual object displayed by the AR HMD 100. The user sees the virtual object O approaching his or her hand through the display unit of the AR HMD 100.

As indicated by a wavy line in FIG. 3, tactile presentation is performed by the tactile presentation device 200 worn on the user's hand in response to the approach of the virtual object O, or the like.

The action with respect to the virtual object O may be not only the action of putting out the palm as illustrated in FIG. 3, but also an action of bringing at least a part of the body into contact with the virtual object O In addition, in the user's view, an action of bringing a part of the body, to which the tactile presentation device 200 is fixed closer, to the virtual object O than a distance that is a threshold, for example, is an action of bringing the part of the body into contact with the virtual object O.

The interaction between the virtual object and the user's body may be an action such as stroking, turning the palm, or turning the back of the hand. Examples of the interaction using a finger include actions such as pointing, poking, rubbing, and raising a finger. In addition, the interaction between the virtual object and the user's body may be performed by an action using a part such as the head, the arm, the abdomen, or the leg.

First Embodiment

Figure 4:
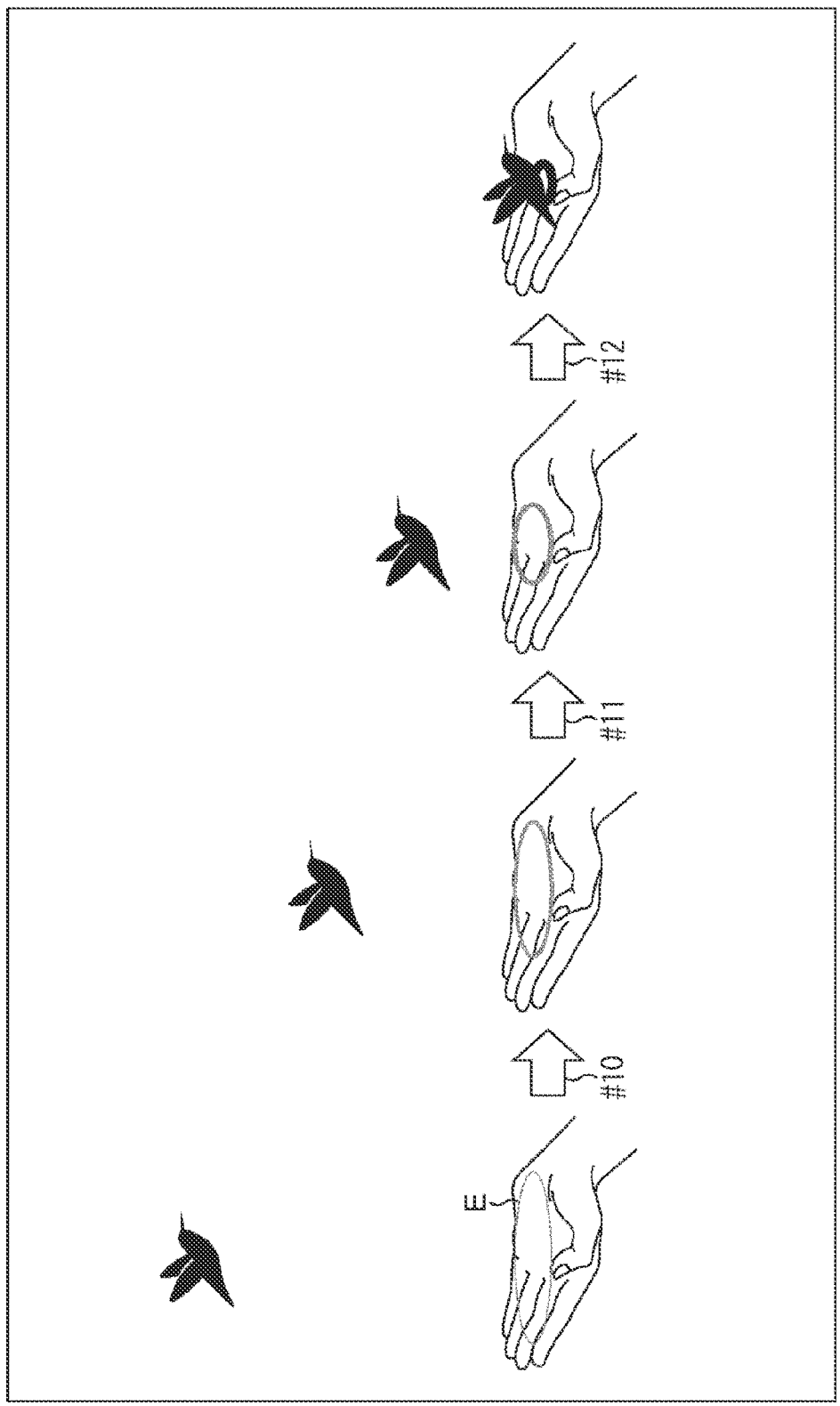
FIG. 4 is a diagram illustrating a first embodiment.

FIG. 4 is a diagram illustrating a display example of an effect image according to a first embodiment.

FIG. 4 illustrates how the user sees the effect image displayed due to the virtual object O. As described above, the effect image is an image indicating the situation of the tactile presentation to the user.

Note that, in FIG. 4, the illustration of the tactile presentation device 200 is omitted. The tactile presentation device 200 is assumed to be worn on the user's hand. Similarly, in other drawings illustrating display examples of effect images, the tactile presentation device 200 is also assumed to be worn.

As illustrated at the left end of FIG. 4, in a case where the virtual object O representing the bird is displayed above the user's palm, a flat-ring-shaped effect image E is displayed to be superimposed on the user's palm. The effect image E is spatially localized and displayed at a corresponding position of the user's palm vertically below the virtual object O.

The user can intuitively perceive that the virtual object O exists vertically above the palm by observing the effect image E via the display unit of the AR HMD 100.

As indicated by the tips of arrows #10 and #11, the size of the effect image E gradually changes as the virtual object O approaches the user's palm. The size of the effect image E is determined according to the positional relationship between the virtual object O and the user's finger. As illustrated in FIG. 4, as the virtual object O approaches the user's finger, the effect image E is displayed gradually smaller. As the size changes, the line thickness and color density of the effect image E also change as appropriate.

When the virtual object O approaches its contact position with the user's palm, the virtual object O performing an action of landing on the palm is displayed.

The tip of arrow #12 indicates a state in which the virtual object O has landed on the user's palm. By the virtual object O landing on the user's palm, the distance between the virtual object O and the user's palm becomes closer, and hence the size of the effect image E further decreases.

In a case where the virtual object O lands on the user's palm, tactile presentation is performed from the tactile presentation device 200 worn on the user's hand on the basis of the landing position. In the example of FIG. 4, the virtual object O lands at a substantially central position of the palm. In this case, the tactile presentation device 200 performs tactile presentation such that a weight is felt at a substantially central position of the palm.

Furthermore, the display of the effect image E is controlled according to the situation of the tactile presentation. In the case of the example of FIG. 4, the color of the effect image E becomes darker in response to the tactile presentation from the tactile presentation device 200 in response to the landing of the virtual object O.

As described above, the display of the effect image E is controlled according to the situation of the tactile presentation caused by the contact of the virtual object O with the part of the user's body.

In a case where the display of the virtual object O and the effect image E changes as illustrated in FIG. 4, as the virtual object O approaches, the user gradually directs attention to substantially the center of his or her palm on which the effect image E is displayed. By performing tactile presentation and displaying the effect image targeting the user's focus position, it is possible to enhance the user's perception that tactile presentation is being performed substantially at the center of the palm and to provide the user with a more realistic sensation that the virtual object O has landed substantially at the center of the palm.

That is, by concentrating the user's attention on substantially the center of the palm with the display of the effect image E, it is possible to realize a masking effect on sensations for positions other than substantially the center and to enhance the user's perception that tactile presentation is being performed targeting substantially the center of the palm. As described above, the effect image E indicates the situation of the tactile presentation and also has a function of emphasizing the situation and enhance the perception of the situation.

Not only the size, line thickness, and density of the effect image E but also the color or shape of the effect image E may be changed. At least one of various components of the effect image, such as size, line thickness, density, color, shape, transmittance, luminance, brightness, and the like may be changed.

The effect image E may be changed on the basis of metadata (type, size, density, etc.) associated with the virtual object included in the content information.

The effect image E may be displayed at a destination (a predicted landing point or a predicted fall point) of the virtual object.

Figure 5:
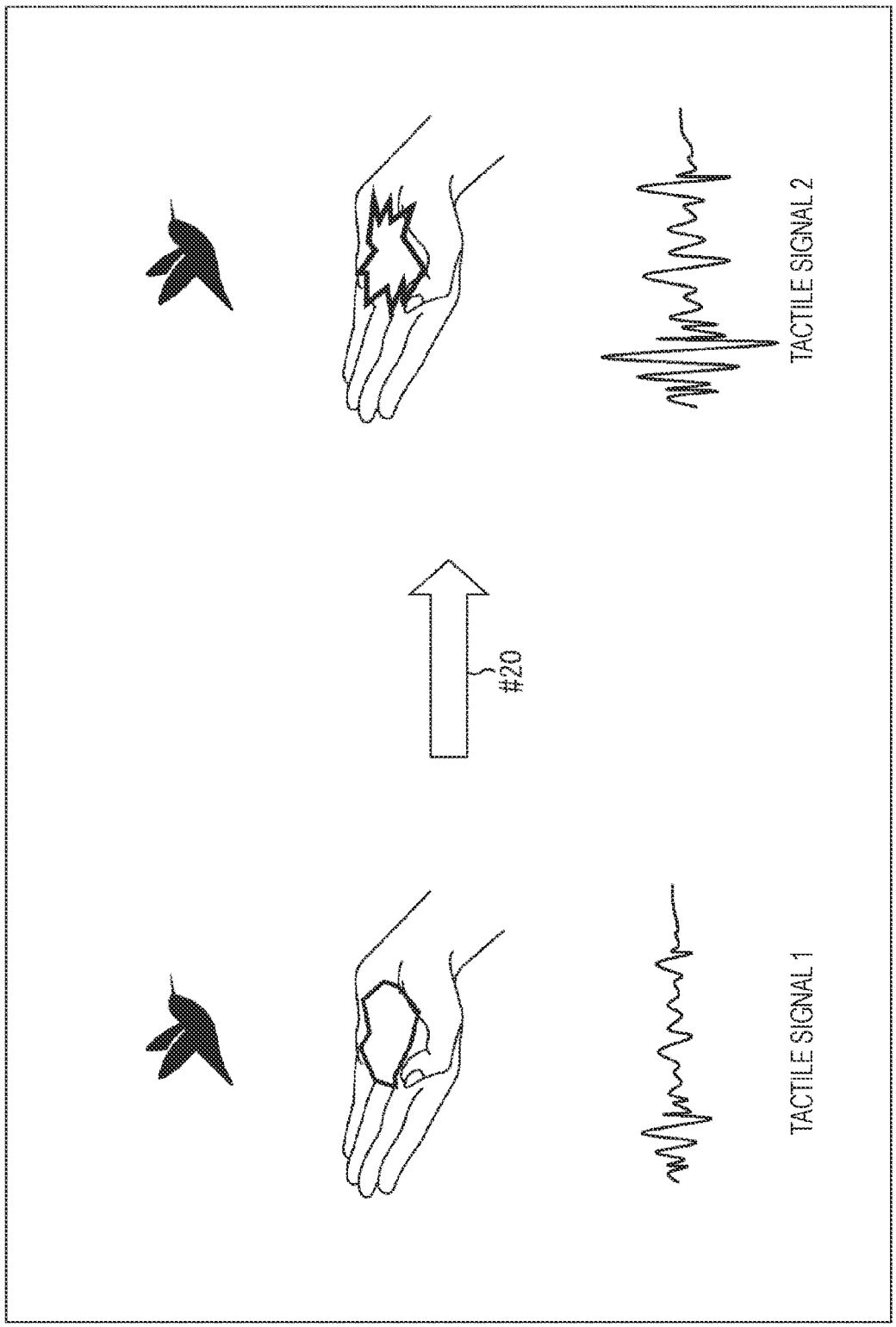
FIG. 5 is a diagram illustrating the first embodiment.

FIG. 5 is a diagram illustrating another display example of the effect image according to the first embodiment.

FIG. 5 illustrates a state in which the virtual object O representing the bird is performing a movement of flapping its wings above the user's hand. The display of the effect image E indicating the situation of the tactile presentation caused by the movement of the virtual object O is controlled.

In the example on the left side of FIG. 5, tactile presentation is performed from the tactile presentation device 200 to the user's hand on the basis of a tactile signal 1 corresponding to the movement of the virtual object O. For example, a sensation that the wind generated by the flapping of the wings of the bird hits the palm is presented.

The tactile signal is a signal representing a vibration pattern, intensity, or the like used for tactile presentation. The tactile signal indicates the situation of the tactile presentation. For example, the tactile signal is supplied from the AR HMD 100 to the tactile presentation device 200, and tactile presentation is performed by the tactile presentation device 200. Furthermore, in the example on the left side of FIG. 5, the effect image E is displayed as a distorted circular image according to the waveform of the tactile signal 1.

In a case where the content of the presented sensation changes due to a change in the movement of the virtual object O or the like, tactile presentation is performed on the user's hand on the basis of a tactile signal 2 corresponding to the movement of the virtual object O after the change, as indicated by the tip of arrow #20. The tactile signal 2 is a signal with a larger amplitude than the tactile signal 1, and a tactile sensation larger than a tactile sensation presented by the tactile signal 1 is presented.

The tactile presentation based on the tactile signal 2 presents a larger tactile sensation than the tactile presentation based on the tactile signal 1, so that the effect image E in the scene at the tip of arrow #20 is the effect image E with a larger distortion.

In this manner, the display of the effect image E is controlled on the basis of the tactile signal that is information regarding the situation of the tactile presentation performed to the user. The tactile presentation is performed at any position, size, and timing.

<<System Configuration>>

Here, a configuration of each apparatus constituting the information processing system will be described.

Figure 6:
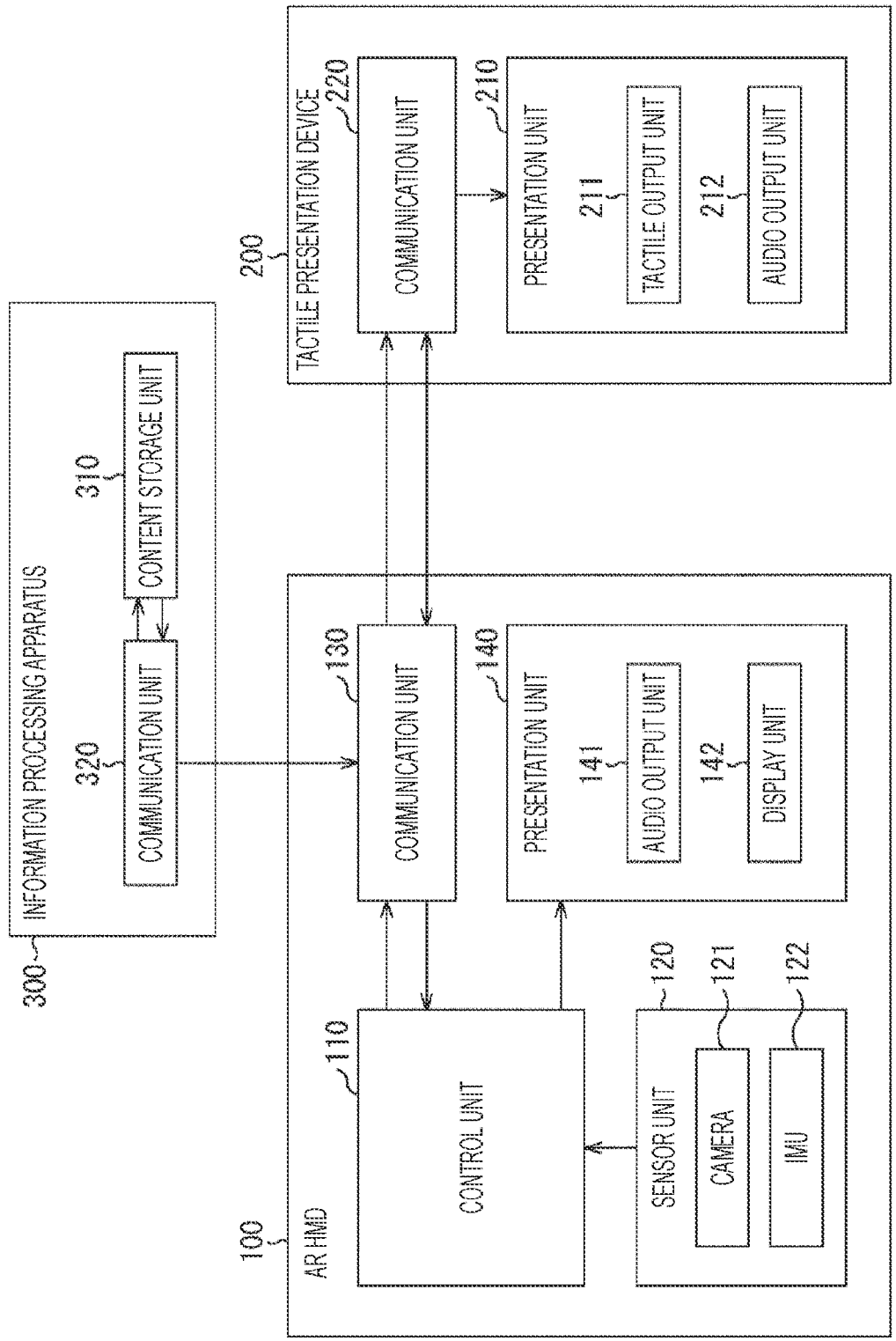
FIG. 6 is a diagram illustrating a configuration example of each apparatus device.

FIG. 6 is a block diagram illustrating configuration examples of the AR HMD 100, the tactile presentation device 200, and the information processing apparatus 300.

As illustrated in FIG. 6, the AR HMD 100 is configured by connecting a sensor unit 120, a communication unit 130, and a presentation unit 140 to the control unit 110.

The control unit 110 includes a central processing unit (CPU), a read-only memory (ROM), a random-access memory (RAM), and the like. The control unit 110 executes a program stored in the ROM or a memory (not illustrated) and controls the entire action of the AR HMD 100.

For example, the control unit 110 causes the display unit 142 of the AR HMD 100 to display the virtual object and the effect image. Specifically, the control unit 110 specifies the three-dimensional position of the real object existing in the real space on the basis of sensor information acquired from the sensor unit 120, and controls the display of the virtual object and the effect image so as to be spatially localized at arbitrary positions in the real space.

Furthermore, the control unit 110 controls the display of the effect image on the basis of information regarding the situation of the tactile presentation caused by the object, which is determined by the content information and the sensor information acquired from the sensor unit 120. The object may be a real object or a virtual object.

The display control for the effect image by the control unit 110 includes controlling the display position, size, thickness, color, distortion, transmittance, luminance, brightness, and the like of the effect image on the basis of the situation of the tactile presentation caused by the object.

Examples of the situation of the tactile presentation include a situation determined by the position, intensity, timing, and the like of the tactile presentation. Specifically, the situation of the tactile presentation is determined on the basis of a tactile signal generated on the basis of the content information and the sensor information acquired from the sensor unit 120. The display position of the effect image is determined on the basis of the position of the tactile presentation. Furthermore, the size, thickness, color, and distortion of the effect image are determined by the intensity and range of the tactile presentation.

Moreover, the control unit 110 controls the display of the effect image on the basis of the movement of the object, the relative position between the object and the user's body, the pressure or the pressure magnitude of the tactile presentation generated by the object on the user's body, and the situation of the tactile presentation caused by at least one of a plurality of objects.

Furthermore, in a case where the tactile presentation position (the position of the tactile presentation device 200) is outside the range of the display viewing angle of the AR HMD 100, the control unit 110 controls the display of the effect image within the range of the display viewing angle on the basis of the positional relationship between the display unit 142 of the AR HMD 100 and the tactile presentation position. In a case where the object is a real object existing in the real space, the control unit 110 may control the display of the effect image on the basis of the size, weight, and the like of the real object. Details of each display will be described later.

For example, in a case where the object is a virtual object, as illustrated in FIG. 4, the control unit 110 changes the color of the effect image in response to the tactile presentation being performed according to the landing action of the virtual object representing the bird. Furthermore, as illustrated in FIG. 5, the control unit 110 controls the distortion of the effect image in response to the tactile presentation being performed according to the flapping movement of the virtual object representing the bird.

The effect image may be an image with any shape. As illustrated in FIGS. 4 and 5, the effect image may be configured by a flat-ring-shaped image, or the effect image may be configured by an image with any shape such as a dot or an arrow. Furthermore, an effect image may be configured by an image with a three-dimensional shape.

In a case where it is determined that tactile presentation is not possible from the tactile presentation device 200, the control unit 110 may switch to outputting only the effect image. Furthermore, in a case where the effect image cannot be displayed on the palm, the effect image may be displayed at a position with reference to the position of the virtual object.

The sensor unit 120 includes a camera 121 and an inertial measurement unit (IMU) 122.

The camera 121 is configured using a stereo camera, a depth camera, LiDAR, or the like. The camera 121 captures an image of a real space around the user and generates a captured image. The captured image is output to the control unit 110.

Furthermore, the distance from the AR HMD 100 to each position in the real space is measured on the basis of the captured image generated by the camera 121. The control unit 110 measures the distance and generates distance information and point cloud data for each position in the real space.

The IMU 122 includes various sensors such as an acceleration sensor and a gyro sensor. The IMU 122 detects the position and orientation of the AR HMD 100. Information regarding the position and the orientation, which is the detection result of the IMU 122, is output to the control unit 110 as a part of the sensor information.

On the basis of the positional relationship of the AR HMD 100 with respect to each position in the real space and the orientation of the AR HMD 100 acquired by the sensor unit 120, the control unit 110 can determine the display positions in the real space at which the virtual object and the effect image are displayed, and display the virtual object and the effect image on the display unit 142 of the AR HMD 100 so as to be spatially localized at the display positions.

The communication unit 130 includes a communication module such as a wireless LAN. The communication unit 130 communicates with the information processing apparatus 300 via the network 400 and acquires content information from the information processing apparatus 300.

Furthermore, the communication unit 130 communicates with the tactile presentation device 200 and outputs a tactile signal and sound information to the tactile presentation device 200.

The presentation unit 140 includes an audio output unit 141 and a display unit 142.

The audio output unit 141 includes a speaker. The audio output unit 141 outputs sound related to the virtual object or sound corresponding to the display of the effect image according to the control by the control unit 110 based on the content information. The content information includes image information of a virtual object and an effect image to be displayed on the display unit 142, sound information associated with the virtual object and the effect image, and information regarding tactile presentation.

The display unit 142 includes, for example, a transmissive display. The display unit 142 displays at least one of the virtual object or the effect image under the control of the control unit 110.

The tactile presentation device 200 includes a presentation unit 210 and a communication unit 220.

The presentation unit 210 includes a tactile output unit 211 and an audio output unit 212.

The tactile output unit 211 is, for example, a vibration generator such as an eccentric motor or a piezoelectric actuator capable of generating vibration. The tactile presentation mechanisms 200a to 200m in FIG. 2 correspond to the tactile output unit 211. In addition to the vibration generator that applies vibration, a tactile presentation mechanism that applies pressure, temperature, frictional force, force sensation, or the like may be used as the tactile output unit 211.

The tactile output unit 211 performs tactile presentation on the basis of the tactile signal supplied from the communication unit 220. In a case where the tactile output unit 211 includes a plurality of tactile presentation mechanisms, it is possible to perform tactile presentation from a tactile presentation mechanism at an arbitrary position on the basis of a tactile signal. In that case, tactile presentation is performed from at least one of the plurality of tactile presentation mechanisms.

In a case where the communication unit 220 acquires information regarding the position of the tactile presentation caused by the object, the tactile presentation mechanism to be operated may be determined on the basis of the position of the tactile presentation.

The audio output unit 212 performs audio presentation on the basis of the sound information included in the content information supplied from the communication unit 220. As described above, the audio output unit 212 may be provided in the tactile presentation device 200.

The communication unit 220 receives the tactile signal and the sound information output from the communication unit 130 of the AR HMD 100, and outputs the tactile signal and the sound information to the presentation unit 210.

The information processing apparatus 300 includes a content storage unit 310 and a communication unit 320.

The content storage unit 310 stores content information. The content information includes image information of a virtual object and an effect image to be displayed on the display unit 142, sound information associated with the virtual object and the effect image, and information regarding tactile presentation. Audio information based on the sound information is performed from the audio output unit 141 or the audio output unit 212. The tactile presentation based on the tactile signal is performed from the tactile output unit 211. The effect image may be recorded in association with the virtual object. Furthermore, the effect image may be recorded as an effect image related to any tactile presentation. Metadata (type, size, density, etc.) associated with the virtual object may be included in the content information.

The content storage unit 310 has been described to be included in the information processing apparatus 300, but may be included in any configuration in the information processing system. For example, the AR HMD 100 or the tactile presentation device 200 may include the content storage unit 310.

The communication unit 320 transmits the content information stored in the content storage unit 310 to the AR HMD 100. When the communication unit 320 transmits the content information, a virtual object, an effect image, and the like can be displayed on the AR HMD 100.

Figure 7:
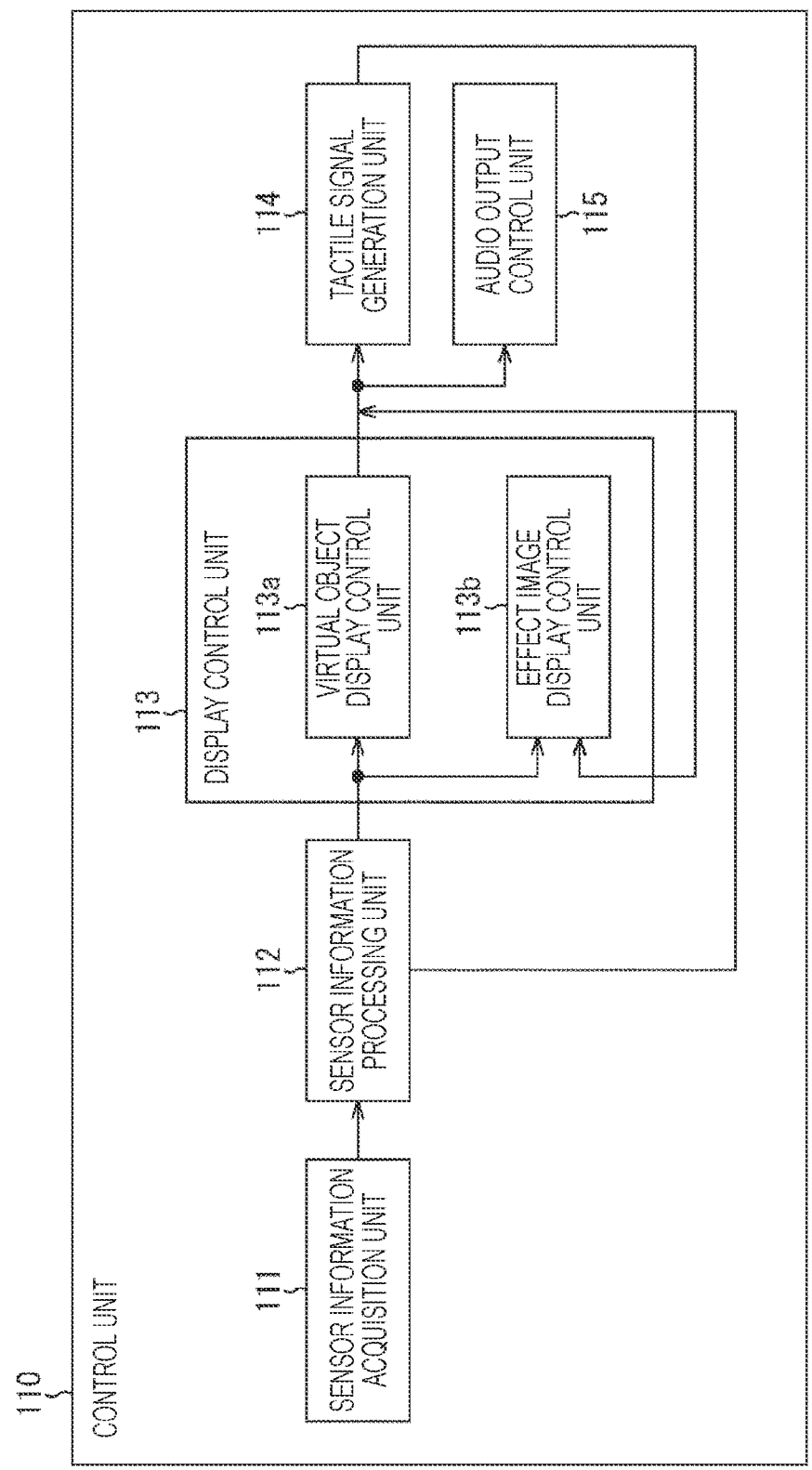
FIG. 7 is a diagram illustrating a configuration example of a control unit.

FIG. 7 is a block diagram illustrating a functional configuration example of the control unit 110.

The control unit 110 includes a sensor information acquisition unit 111, a sensor information processing unit 112, a display control unit 113, a tactile signal generation unit 114, and an audio output control unit 115. At least a part of the configuration illustrated in FIG. 7 is realized by executing a predetermined program by the CPU of the control unit 110.

The sensor information acquisition unit 111 acquires the sensor information supplied from the sensor unit 120. The sensor information includes a captured image showing the real space around the user acquired by the camera 121 and the measurement result of the position and orientation of the AR HMD 100 acquired by the IMU 122. The sensor information acquired by the sensor information acquisition unit 111 is output to the sensor information processing unit 112.

The sensor information processing unit 112 specifies the position and orientation of the AR HMD 100 in the real space and the position of the real object in the real space on the basis of the sensor information. The real object may include the user's hand equipped with the tactile presentation device 200, a real object operated by the user's hand, or the like. Information such as the position and orientation of the AR HMD 100 and the position of the real object specified by the sensor information processing unit 112 is output to the display control unit 113.

The display control unit 113 includes a virtual object display control unit 113a and an effect image display control unit 113b.

The virtual object display control unit 113a controls the display of the virtual object on the basis of the positional relationship between the position and orientation of the AR HMD 100 in the real space, specified on the basis of the sensor information, and the real object in the real space. Specifically, the virtual object display control unit 113a controls the position and orientation, display timing, movement, size, and the like of the virtual object displayed on the display unit 142.

The effect image display control unit 113b controls the display of the effect image on the basis of the positional relationship between the position and orientation of the AR HMD 100 in the real space, specified on the basis of the sensor information, and the real object in the real space. Specifically, the effect image display control unit 113b controls the position and orientation, display timing, movement, size, thickness, color, distortion, and the like of the effect image displayed on the display unit 142. The display control for the effect image is performed on the basis of the situation of the tactile presentation caused by the object.

Furthermore, the effect image display control unit 113b controls the display of the effect image on the basis of a tactile signal generated by the tactile signal generation unit 114.

At the time of reproducing the content information, the tactile signal generation unit 114 generates a tactile signal on the basis of information regarding tactile presentation and the sensor information, and outputs the tactile signal to the tactile device. The content information includes information regarding tactile presentation that is a source of generation of a tactile signal. The position, size (intensity), timing, range, and the like of the tactile presentation in the tactile presentation device 200 are determined by the tactile signal. The generated tactile signal is information indicating the situation of the tactile presentation.

The audio output control unit 115 controls the audio output from at least one of the audio output unit 141 or the audio output unit 212 on the basis of the sound information included in the content information. The position, volume, timing, and the like of the audio presentation are controlled on the basis of the situation of the tactile presentation caused by the object.

<<Flow of Each Processing>>

The flow of the processing by the control unit 110 will be described.

<Flow of Effect Image Display Control According to Distance of Virtual Object>

Figure 8:
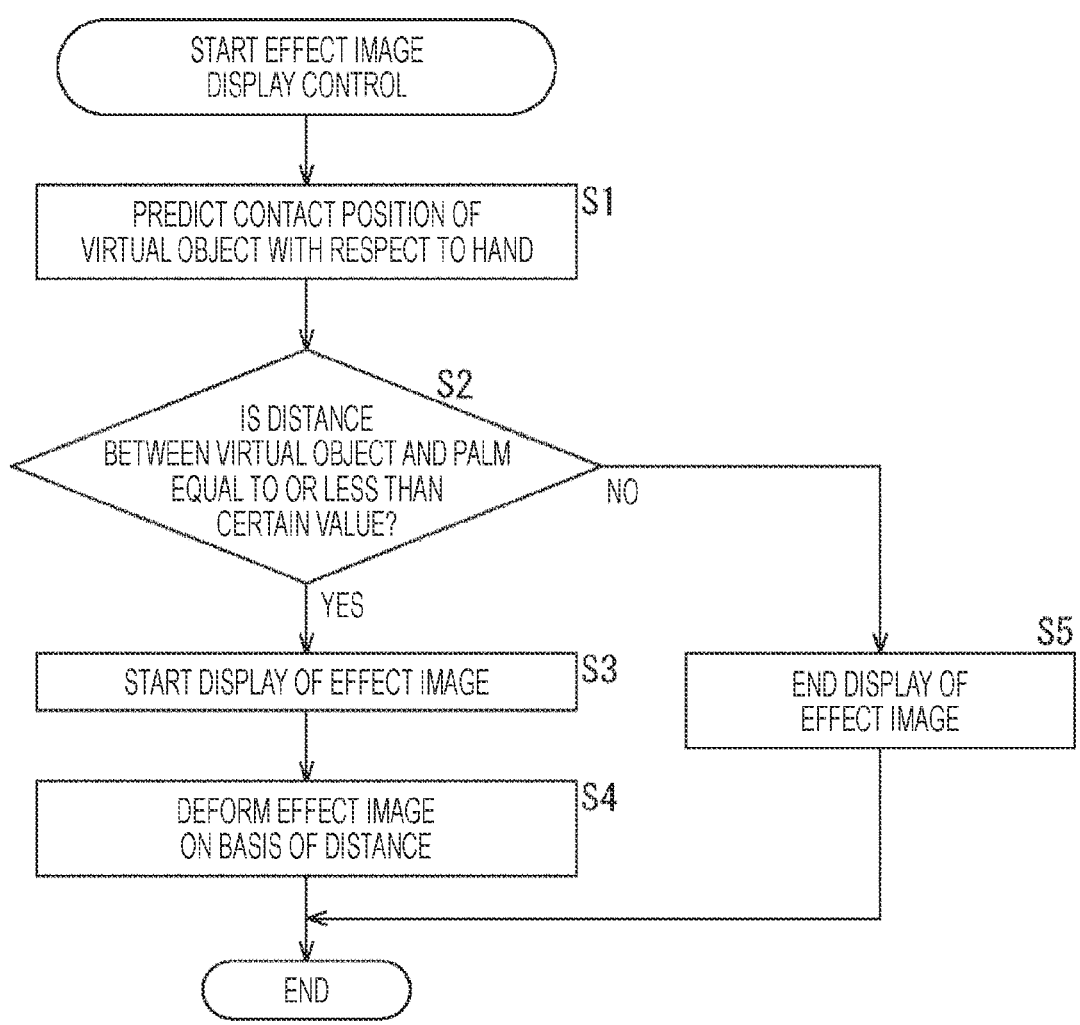
FIG. 8 is a diagram illustrating a flow of processing of effect image deformation.

First, effect image display control processing according to the distance between the virtual object and the user's body (e.g., the user's palm) will be described with reference to a flowchart in FIG. 8.

In step S1, the sensor information processing unit 112 predicts the contact position of the virtual object with respect to the hand on the basis of the sensor information acquired by the sensor information acquisition unit 111.

In step S2, the sensor information processing unit 112 determines whether or not the distance between the virtual object and the palm is equal to or less than a certain value.

In a case where it is determined that the distance between the virtual object and the user's body is equal to or less than the certain value (YES), in step S3, on the basis of the prediction result of the contact position, the effect image display control unit 113b starts the display of the effect image at a position with reference to the contact position between the virtual object and the palm.

In step S4, the effect image display control unit 113b deforms the effect image on the basis of the distance between the virtual object and the palm. For example, as the distance between the virtual object and the palm decreases, deformation is performed such that the size of the effect image is reduced, the line thickness is increased, or the color density is increased.

On the other hand, in a case where it is determined that the distance between the virtual object and the user's body is not equal to or less than the certain value (NO), the effect image display control unit 113b ends the display of the effect image in step S5.

<Flow of Tactile Presentation According to Action of Virtual Object>

Figure 9:
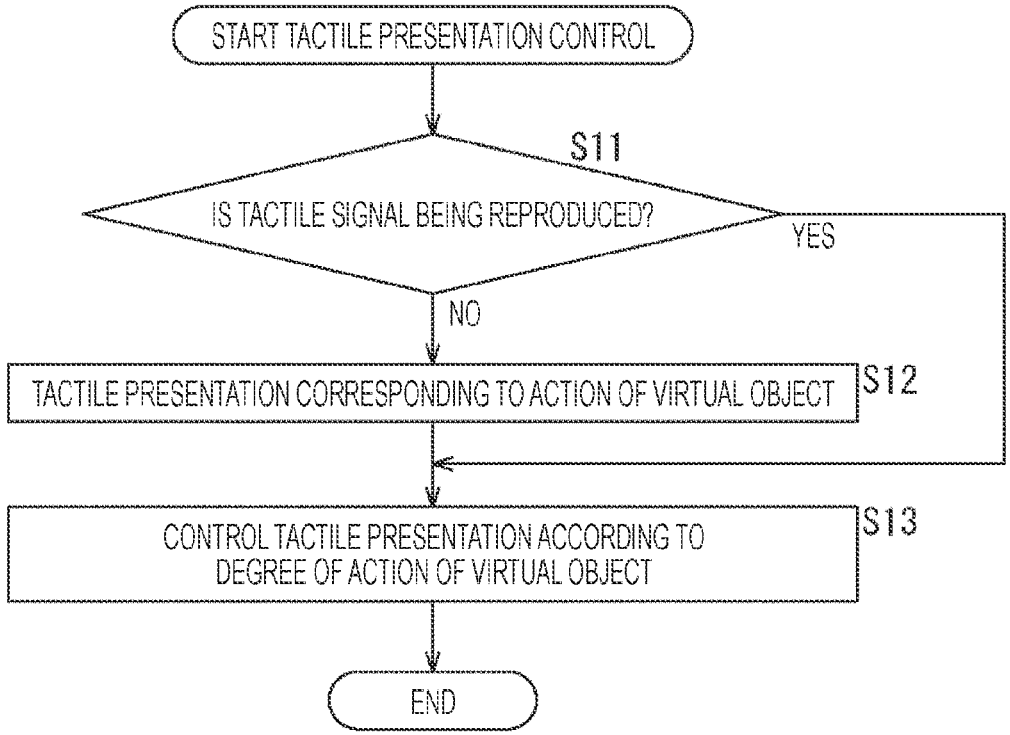
FIG. 9 is a diagram illustrating a flow of processing of tactile signal reproduction.

Next, tactile presentation control processing according to the action of the virtual object will be described with reference to a flowchart in FIG. 9.

In step S11, the tactile signal generation unit 114 determines whether or not a tactile signal is being reproduced, that is, whether or not tactile presentation according to the tactile signal is being performed by the tactile output unit 211.

In a case where it is determined in step S11 that tactile presentation is not being performed (NO), in step S12, the tactile signal generation unit 114 starts tactile presentation according to the action of the virtual object. Specifically, the tactile signal to be reproduced is determined according to the action of the virtual object (the bird flaps its wings, lands on the palm, etc.) or the timing of the audio signal (the bird sings, explodes, etc.) that has started being reproduced, and the reproduction of the tactile signal is started.

In step S13, the tactile signal generation unit 114 performs tactile presentation in response to the action of the virtual object. Specifically, as the degree of action (action frequency, action speed, distance to the presentation position such as the palm, moving speed, etc.) of the virtual object is larger, the control is performed such that the intensity of the tactile presentation is increased or the frequency component is pitch-shifted to the high-frequency side.

Similarly, in a case where it is determined in step S11 that tactile presentation is being performed (YES) in the tactile output unit 211, tactile presentation is controlled in step S13 according to the degree of action of the virtual object.

<Flow of Effect Image Display Corresponding to Tactile Signal>

Figure 10:
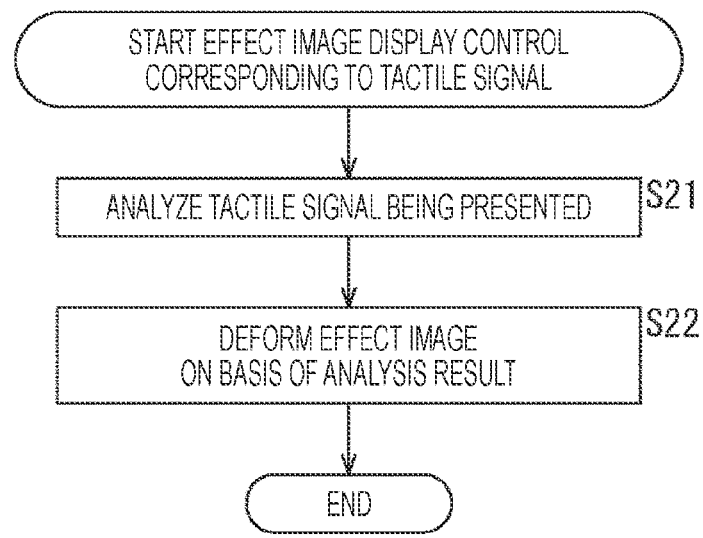
FIG. 10 is a diagram illustrating the flow of the processing of the effect image deformation according to a tactile signal.

Next, tactile presentation according to the action of the virtual object will be described with reference to a flowchart in FIG. 10.

In step S21, the tactile signal generation unit 114 analyzes the tactile signal used for tactile presentation from the tactile presentation device 200 to the user's body. Specifically, the tactile signal generation unit 114 analyzes temporal changes in the position, frequency, amplitude, and the like of the tactile presentation indicated by the tactile signal. The situation of the tactile presentation is specified on the basis of the analysis result.

In step S22, the effect image display control unit 113b controls the display of the effect image on the basis of the analysis result of the tactile signal. For example, processing of distorting a line constituting the effect image on the basis of a time-series change, changing the width of each of a plurality of rings displayed as the effect image on the basis of a peak frequency, or changing the thickness of the effect image on the basis of amplitude is performed.

The above processing is repeatedly performed, for example, while the virtual object is displayed. By changing the display of the effect image according to the situation of the tactile presentation, it is possible to enhance the user's perception of the tactile presentation targeting the position of a part of the body.

Second Embodiment

<Display of Effect Image>

Figure 11:
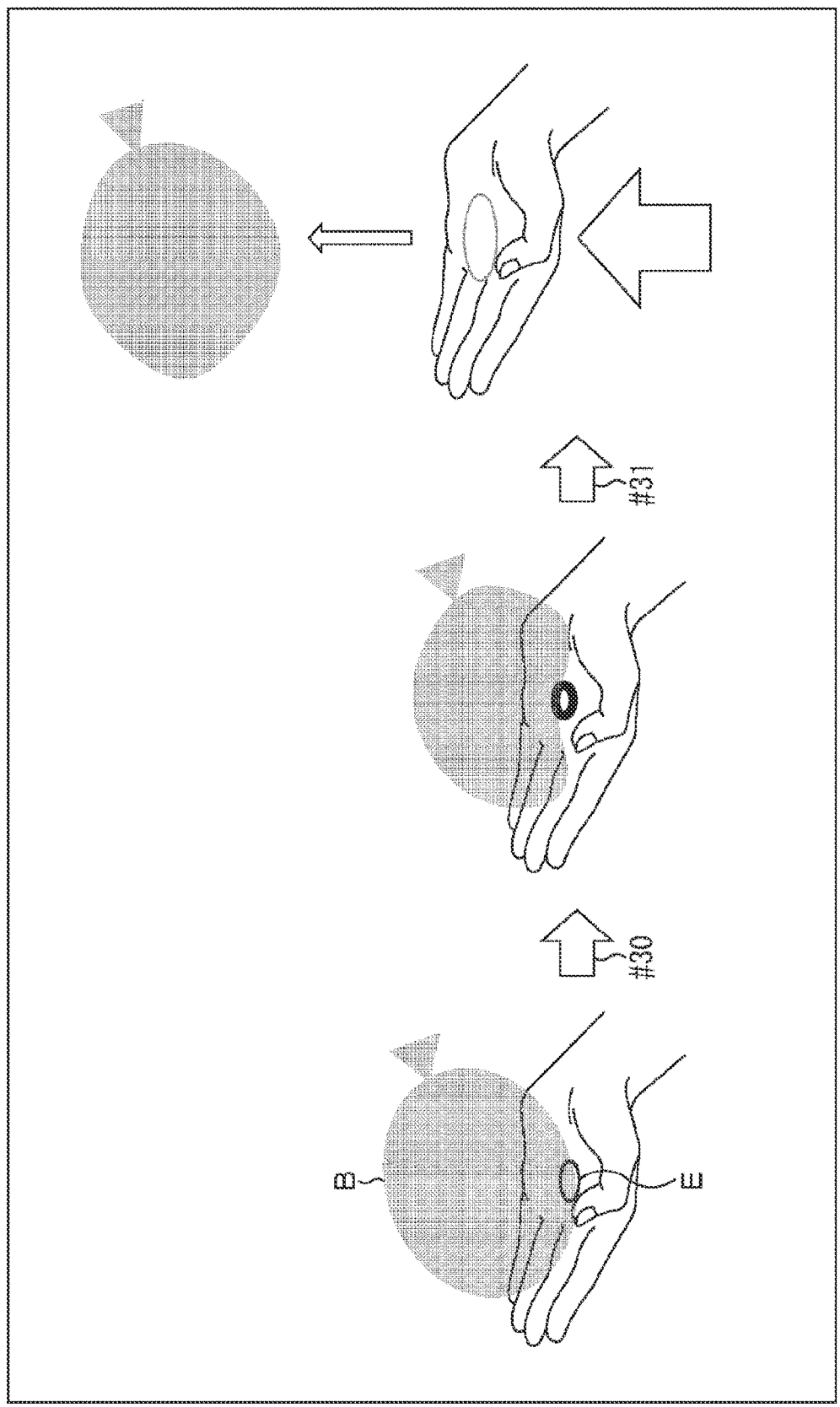
FIG. 11 is a diagram illustrating a second embodiment.
Figure 12:
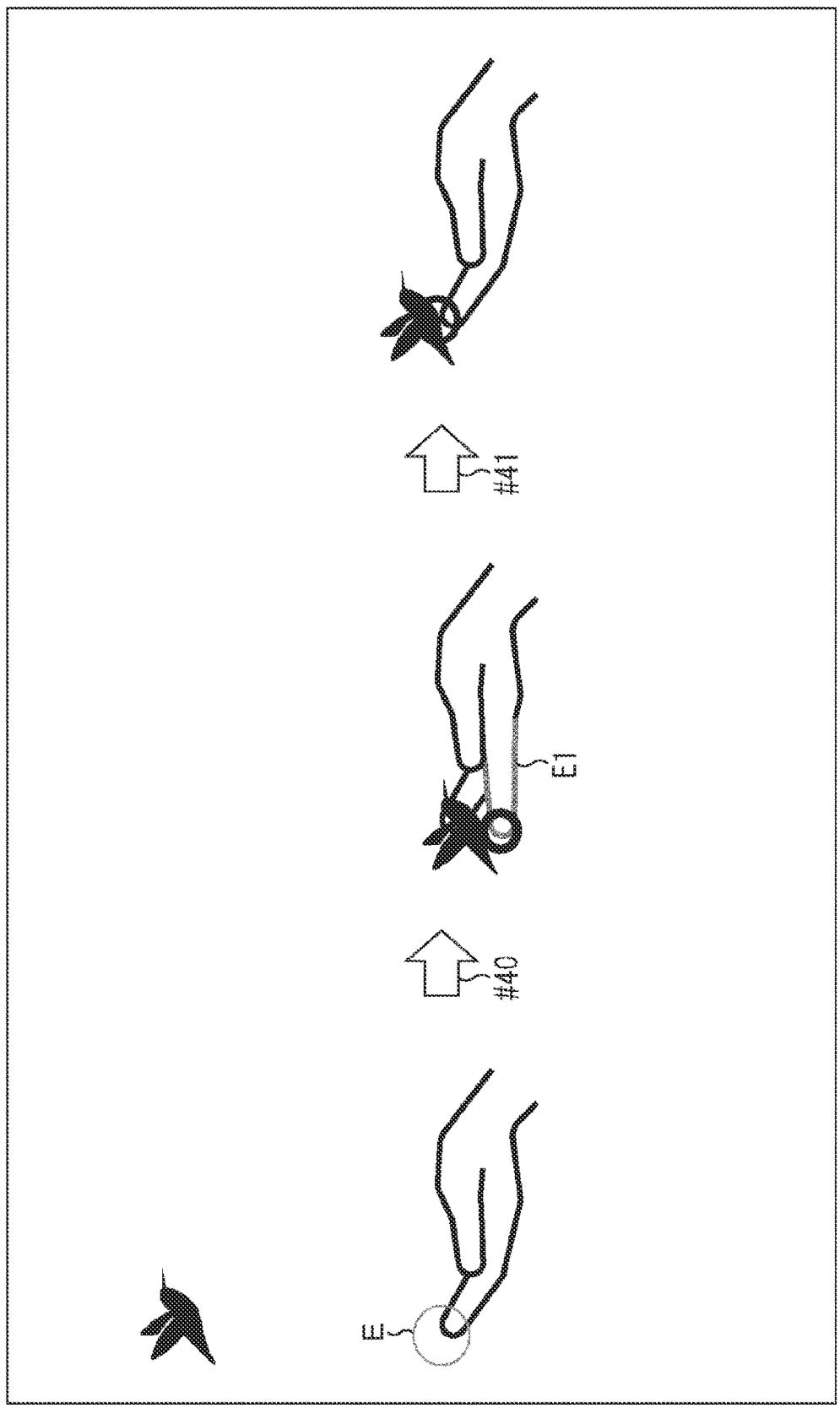
FIG. 12 is a diagram illustrating the second embodiment.

FIGS. 11 and 12 are diagrams illustrating display examples of an effect image according to a second embodiment.

FIGS. 11 and 12 illustrate how the user sees the effect image E, which is displayed according to the pressure generated due to the virtual object. The pressure is presented from the tactile presentation device 200.

FIG. 11 illustrates how the user sees the effect image E, which is displayed according to the pressure generated in the palm due to a virtual object B representing a balloon. The pressure applied on the palm when the virtual object B is in contact is expressed by the effect image E.

In the example at the left end of FIG. 11, the virtual object B representing the balloon is displayed so as to be in contact with the user's palm. By the contact, the flat-ring-shaped effect image E is displayed with reference to the position where the virtual object B and the user's palm are in contact with each other. The virtual object B and the effect image E are spatially localized and displayed by the AR HMD 100.

The effect image E illustrated at the left end of FIG. 11 represents, for example, a pressure value "5" at the moment when the virtual object B representing the balloon comes into contact with the palm. The pressure value is a value of pressure generated in the virtual object and the palm, and is calculated on the basis of the weight of the virtual object indicated by information such as metadata included in the content information.

As indicated by the tip of arrow #30, in a case where the virtual object B representing the balloon is deformed like being crushed on the user's palm, the pressure value of the tactile presentation caused by the virtual object B increases.

As the pressure value increases, the effect image E is displayed thicker. The effect image E, indicated by the tip of arrow #30, represents a pressure value "10" that has become larger than the state illustrated at the left end of FIG. 11 in response to the user pushing up the hand.

The presentation of the pressure may be performed using the tactile presentation device 200 capable of presenting the pressure, or may be performed using the tactile presentation device 200 incapable of presenting the pressure. In a case where pressure is presented using the tactile presentation device 200 provided with a vibration generator, tactile presentation may be performed to the user by controlling the intensity of vibration according to the magnitude of the pressure.

As indicated by the tip of arrow #31, in a case where the virtual object is pushed up by the user's palm, bounces in the user's palm, and moves above the user's hand, the pressure value of the tactile presentation caused by the virtual object B is zero.

No pressure is applied when the virtual object B moves away from the user's palm, and hence the effect image E is changed to a lighter color and displayed. The effect image E, indicated by the tip of arrow #31, represents that no pressure has been generated due to the virtual object B (pressure value "0").

Furthermore, the display of the effect image E may be changed by enlarging the size or reducing the thickness according to the relative distance between the user's palm and the virtual object B when the virtual object B moves away from the user's palm.

FIG. 12 illustrates how the user sees the effect image E, which indicates the situation of the tactile presentation caused by the virtual object O representing the bird, and a complementary image E1, which virtually represents a part of the user's body changing in response to the movement of the virtual object O.

In the example at the left end of FIG. 12, the virtual object O representing the bird is displayed above the user's fingertip. At this time, the flat-ring-shaped effect image E is displayed with reference to the position of the user's fingertip vertically below the virtual object O. The virtual object O and the effect image E are spatially localized and displayed by the AR HMD 100.

The user can perceive that the virtual object O exists vertically above the fingertip by observing the effect image E.

As indicated by the tip of arrow #40, in a case where the virtual object O lands on the user's fingertip, the size and thickness of the effect image E are changed. The size and thickness of the effect image E are changed in response to a decrease in the distance between the virtual object O and the user's finger and the application of the pressure on the user's finger due to the landing. The color of the effect image E changes in response to the application of the pressure due to the landing action of the virtual object O, whereby the user can perceive that the pressure has been applied on the fingertip.

The pressure value is calculated by the control unit 110 on the basis of, for example, the weight of the virtual object indicated by information such as the metadata included in the content information, the contact area between the virtual object and the user's body, the magnitude of the movement of the virtual object, and the like.

Furthermore, at the tip of arrow #40, the complementary image E1, which virtually represents the state of the finger pressed downward in response to the landing of the virtual object O, is displayed. The complementary image E1 is displayed to be superimposed on the fingertip on which the virtual object O has landed.

When the virtual object O of the bird lands on the fingertip, the pressure is applied on the fingertip of the user, and hence the virtual movement amount of the finger based on the magnitude of the pressure is calculated by the control unit 110. By the display of the complementary image E1 at the display position determined on the basis of the virtual movement amount, the user can observe the state of the movement of the finger by the complementary image E1.

In the transmissive AR HMD 100, the complementary image E1 is displayed at a position visible to the user together with the real space on the basis of the calculated movement amount. On the other hand, in the case of the video see-through type AR HMD or VR HMD, the display of the user's finger is turned off by image processing, and the complementary image E1 representing the virtual finger is displayed at the position determined on the basis of the movement amount, whereby the display as described above is realized.

The tip of arrow #41 illustrates a state after the landing of the virtual object O. At this time, the pressure applied on the user's finger is smaller than that at the time of the landing action illustrated in the center of FIG. 12, so that the effect image E is displayed with a larger size and smaller thickness.

Furthermore, when the virtual force of pressing the user's finger downward decreases, the display of the complementary image E1 ends. The display position of the virtual object O is a position slightly above the position immediately after the landing of the virtual object O.

At least one of the size, color, or thickness of the effect image E may be changed according to the magnitude of the pressure of the tactile presentation.

As illustrated in FIGS. 11 and 12, the display of the effect image E can be controlled according to the pressure of the tactile presentation caused by the virtual object.

Flow of Processing in Second Embodiment

Flow of Effect Image Display Control Based on Pressure

Figure 13:
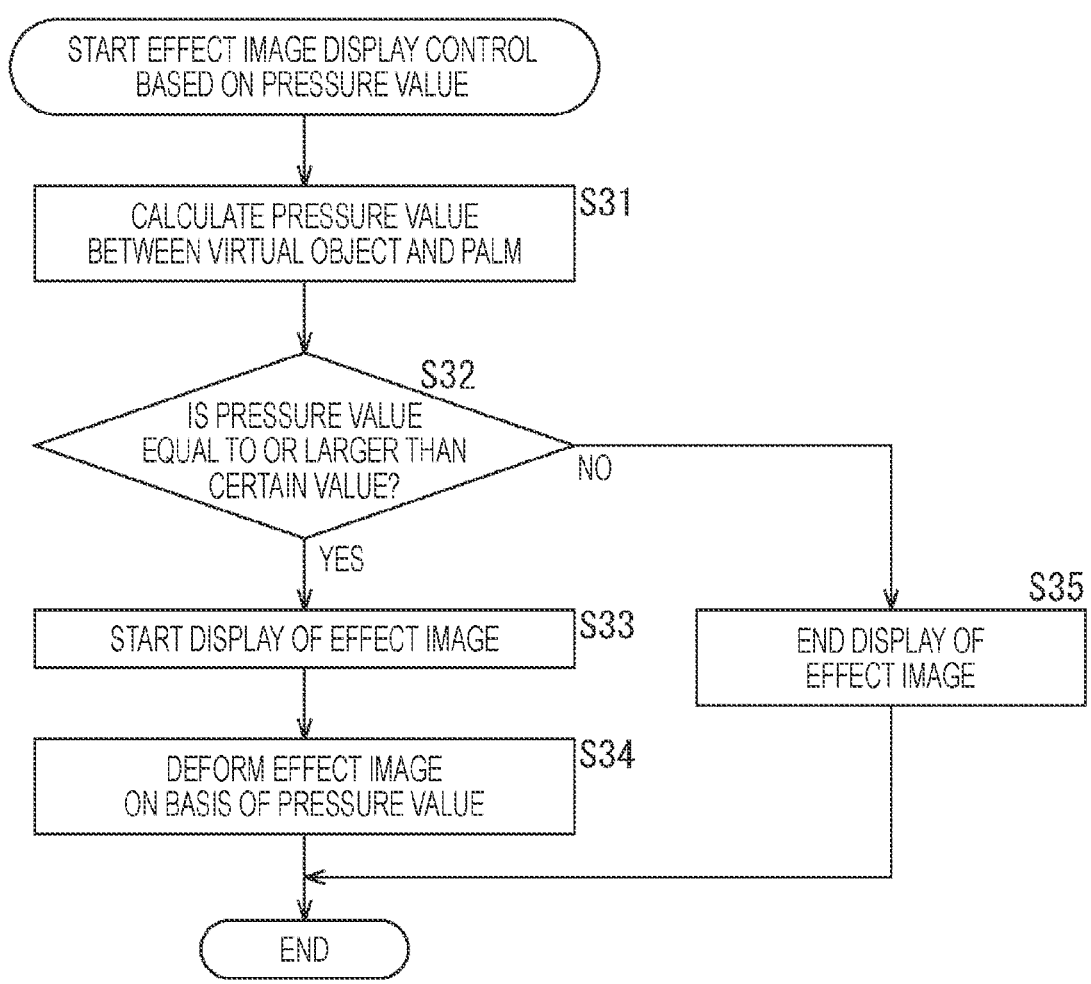
FIG. 13 is a diagram illustrating the flow of the processing of the effect image deformation according to a pressure value.

With reference to a flowchart in FIG. 13, effect image display control processing according to the pressure of the tactile presentation caused by the virtual object will be described.

In step S31, the sensor information processing unit 112 calculates the pressure value between the virtual object and the palm on the basis of the weight information of the virtual object indicated by the metadata included in the content information and the sensor information acquired from the sensor unit 120.

In step S32, the sensor information processing unit 112 determines whether or not the pressure value of the tactile presentation caused by the virtual object is equal to or larger than a certain value.

In a case where it is determined that the pressure value is equal to or larger than the certain value (YES), the effect image display control unit 113b starts the display of the effect image E in step S33.

In step S34, the effect image display control unit 113b deforms the effect image E on the basis of the pressure value. For example, in a case where the pressure value increases, processing of reducing the size of the effect image, increasing the thickness of the line, or increasing the color density is performed.

On the other hand, in a case where it is determined that the pressure value of the tactile presentation caused by the virtual object is not equal to or larger than the certain value (NO), the effect image display control unit 113b ends the display of the effect image E in step S35.

Third Embodiment

Figure 14:
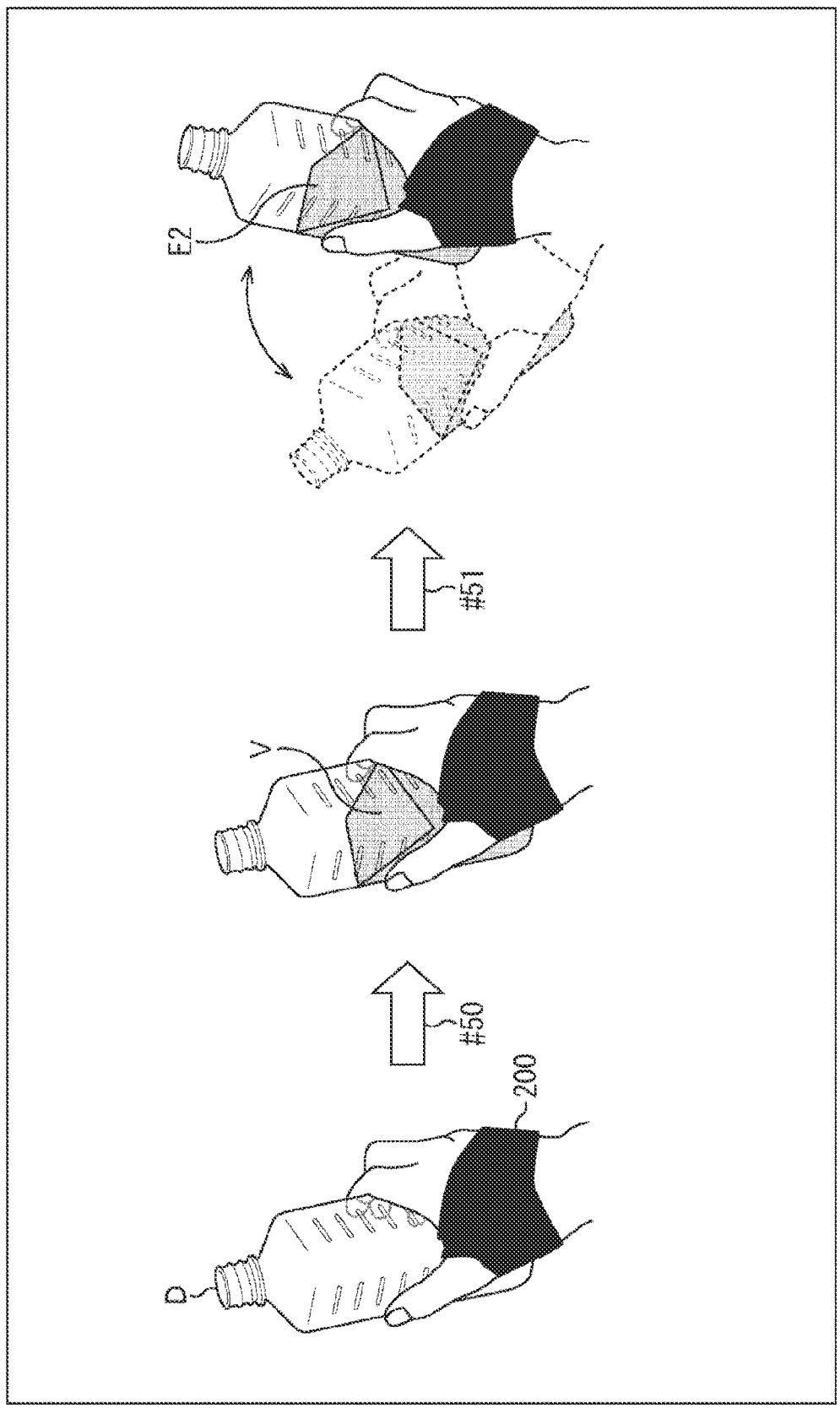
FIG. 14 is a diagram illustrating a third embodiment.
Figure 15:
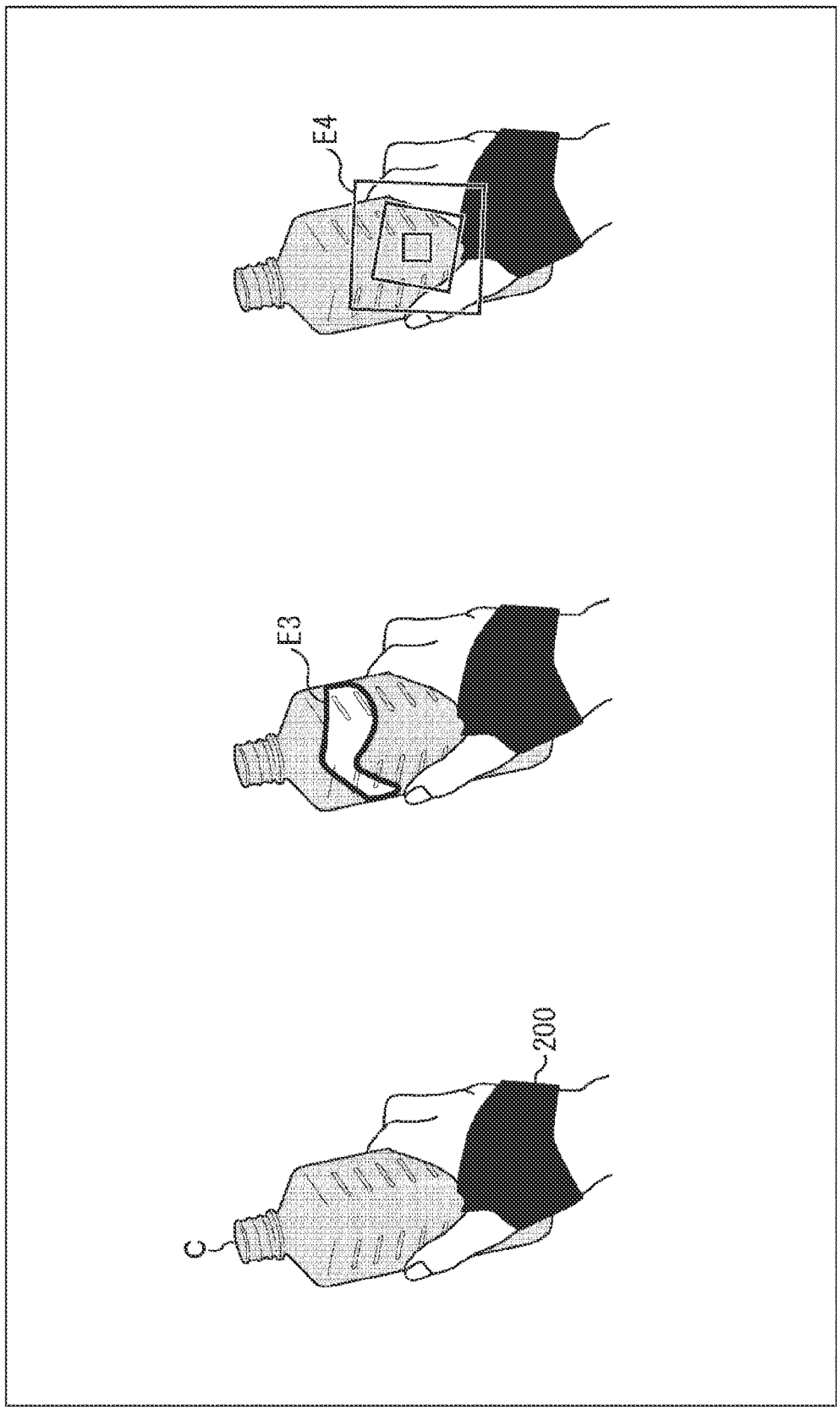
FIG. 15 is a diagram illustrating the third embodiment.

FIGS. 14 and 15 are diagrams illustrating display examples of an effect image according to a third embodiment.

FIGS. 14 and 15 illustrate how the user sees the effect image corresponding to the situation of the tactile presentation caused by the object.

FIG. 14 illustrates how the effect image, which is displayed according to the situation of the tactile presentation caused by the virtual object related to the real object, is seen. Although tactile presentation is caused by the virtual object, it can be said to be caused by the real object because tactile presentation is performed in response to the user's operation on the real object The left end of FIG. 14 illustrates a state in which the user grips a transparent PET bottle that is a real object D. The tactile presentation device 200 is worn on the user's hand. The PET bottle gripped by the user is an empty bottle containing no content.

In a case where it is detected that the user grips the real object D, as indicated by the tip of arrow #50, a virtual object V representing water is displayed as a virtual object related to the PET bottle that is the real object D. The virtual object V is displayed with reference to the position of the real object D such that the virtual object V exists inside the real object D that is the PET bottle.

As indicated by the tip of arrow #51, in a case where the user shakes the PET bottle that is the real object D, the display of the virtual object V changes in response to the movement of the position of the real object D. For example, the virtual object V is displayed in a different position and shape to express a state in which the water in the PET bottle shakes in the actual space.

In this case, the effect image display control unit 113b generates an effect image E2, in which the position and shape of the virtual object V are changed, as the effect image indicating the situation of the tactile presentation caused by the movement of the virtual object V, thereby displaying the effect image on the display unit 142 of the AR HMD 100. In this example, the virtual object V itself has a function as the effect image indicating the situation of the tactile presentation.

Furthermore, tactile presentation to the user's body is performed from the tactile presentation device 200 in response to the change in the position and shape of the virtual object V. The tactile presentation is performed in such a manner as to provide a sensation similar to the sensation at the time of shaking the PET bottle containing water, the user can perceive a sensation as if the water is actually shaking in the real object D.

The type of tactile presentation (vibration, force sensation, etc.) can be changed according to the type of the real object D operated by the user. The magnitude of the tactile presentation output from the tactile presentation device 200 may be changed according to the intensity of the user's operation on the real object D or the movement amount per unit time.

FIG. 15 illustrates how the effect image, which is displayed according to the situation of the tactile presentation caused by the real object operated by the user, is seen.

As illustrated at the left end of FIG. 15, the display of the effect image in a case where the user holds a non-transmissive PET bottle that is a real object C will be described.

In the state at the left end of FIG. 15, no effect image is displayed.

In this case, the effect image display control unit 113b displays an effect image E3 and an effect image E4 on the display unit 142 as effect images indicating situations of the tactile presentation caused by the movement of the real object C that is the PET bottle. The effect image E3 and the effect image E4 are displayed at positions with reference to the position of the real object C that is the PET bottle.

The center of FIG. 15 illustrates a state in which the effect image E3 corresponding to the tactile presentation generated by the user's operation on the real object C is displayed. The PET bottle that is the real object C is opaque, and its content is thus not visible. The effect image E3 is an image visually expressing tactile presentation generated by the water shaking in the PET bottle.

The right end of FIG. 15 illustrates a state in which the effect image E4 corresponding to the tactile presentation generated by a user's operation on the real object C is displayed. The PET bottle that is the real object C is opaque, and its content is thus not visible. The effect image E4 is an image visually expressing tactile presentation generated by the water shaking in the PET bottle.

In the example at the right end of FIG. 15, an image in which small squares are arranged in a square is displayed as the effect image E4. In this manner, the effect image E may be displayed such that the position inside the smallest square can be recognized as the center where tactile presentation is occurring.

The magnitude of the tactile presentation output from the tactile presentation device 200 may be changed according to the intensity of the user's operation on the real object or the movement amount per unit time.

By displaying the effect image in this manner, even in a case where water does not actually exist inside the PET bottle, it is possible to cause the user to perceive tactile presentation due to virtual movement of water inside the PET bottle.

As described above, as illustrated in FIGS. 14 and 15, the display of the effect image E is controlled on the basis of the information regarding the situation of the tactile presentation caused by the real object operated by the user.

Fourth Embodiment

Figure 16:
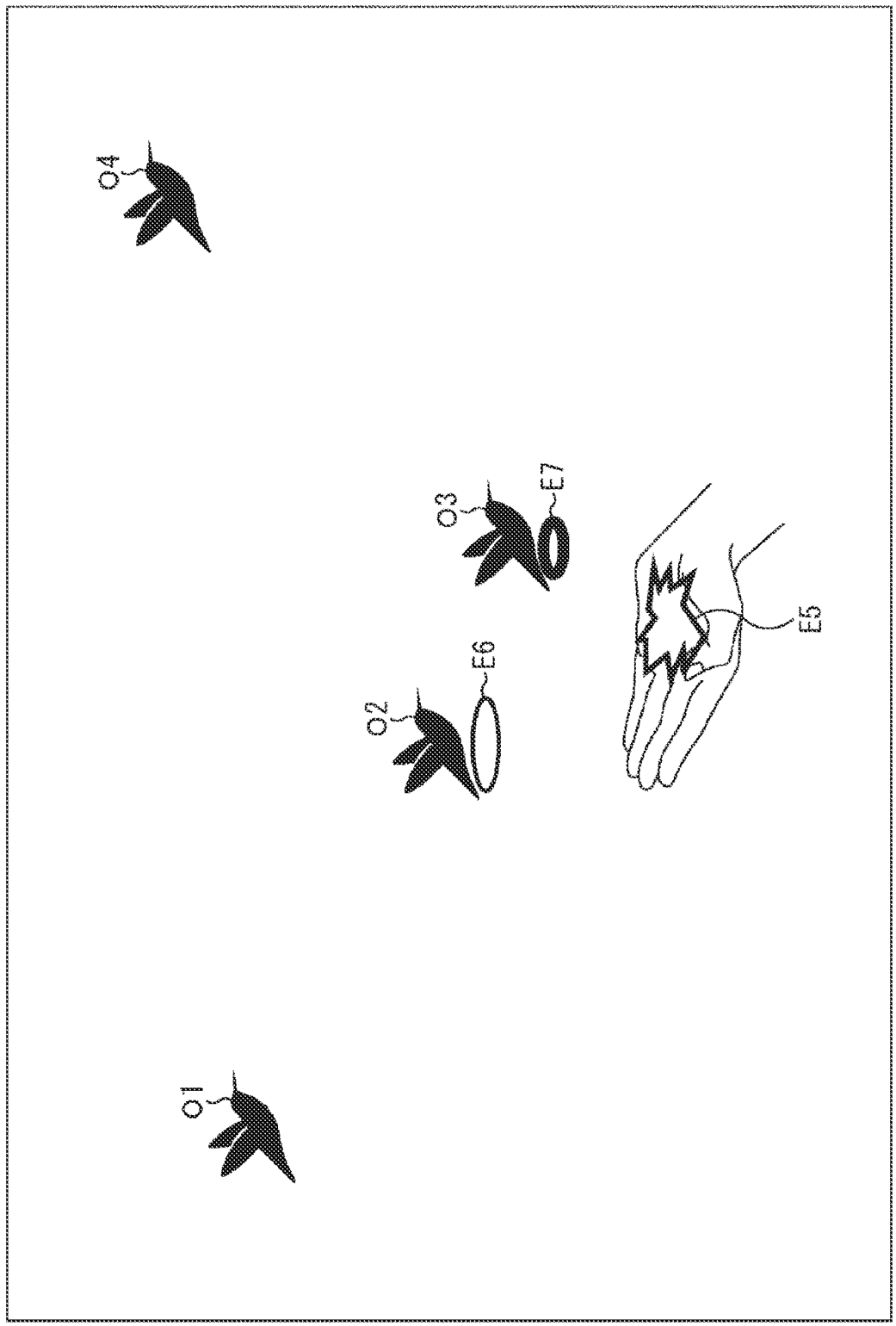
FIG. 16 is a diagram illustrating a fourth embodiment.

FIG. 16 is a diagram illustrating a display example of an effect image according to a fourth embodiment.

FIG. 16 illustrates how an effect image, which is displayed at a position with reference to the position of at least one virtual object that generates tactile presentation among a plurality of virtual objects, is seen.

In the example of FIG. 16, virtual objects O1, O2, O3, O4 representing four birds are displayed above the user's hand. The virtual object O2 and the virtual object O3 are displayed at positions close to the user's hand among the plurality of virtual objects. The tactile presentation caused by the virtual object O2 and the virtual object O3 is performed by the flapping movements of the virtual object O2 and the virtual object O3 representing the birds.

Furthermore, an effect image E5 is displayed on the user's hand. The position of the effect image E5 is a position with reference to the respective positions of the virtual object O2, the virtual object O3, and the user's hand. In the case of FIG. 16, the effect image E5 is displayed at a position with reference to the position of the palm vertically downward between the virtual object O2 and the virtual object O3.

In a case where the virtual object O2 and the virtual object O3 are virtual objects each having a movement such as flapping its wings, the effect image E5 with a distorted shape is displayed. The magnitude of the distortion of the effect image E5 is determined on the basis of the magnitude of the movement of the virtual object.

Furthermore, an effect image E6 and an effect image E7 are displayed at positions with reference to the virtual object O2 and the virtual object O3 so that it can be visually perceived that the virtual object O2 and the virtual object O3 among the plurality of virtual objects are caused by tactile presentation.

The display of the effect image E6 and the effect image E7 may be controlled according to the degree of contribution to the magnitude of the tactile presentation. For example, the virtual object O3 is flapping its wings near the user's palm, and can thus be said to generate tactile presentation in a larger degree than the virtual object O2. In this case, as illustrated in FIG. 16, by displaying the effect image E7 thicker and smaller than the effect image E6, the user can perceive the degree of contribution of the virtual object to the tactile presentation.

The tactile presentation is output from the tactile presentation device 200 fixed to the user's hand to the user's hand.

The effect image may have the same shape as the contour of the object or the same color (the average value of color, most frequently used color, etc.) as the color of the object so that the object causing tactile presentation can be confirmed.

The same number of effect images as the number of objects causing tactile presentation may be displayed, or a combined effect image may be displayed.

As described above, as illustrated in FIG. 16, the display of the effect image may be controlled at a position with reference to the position of at least one virtual object that generates tactile presentation among the plurality of virtual objects.

Fifth Embodiment

Figure 17:
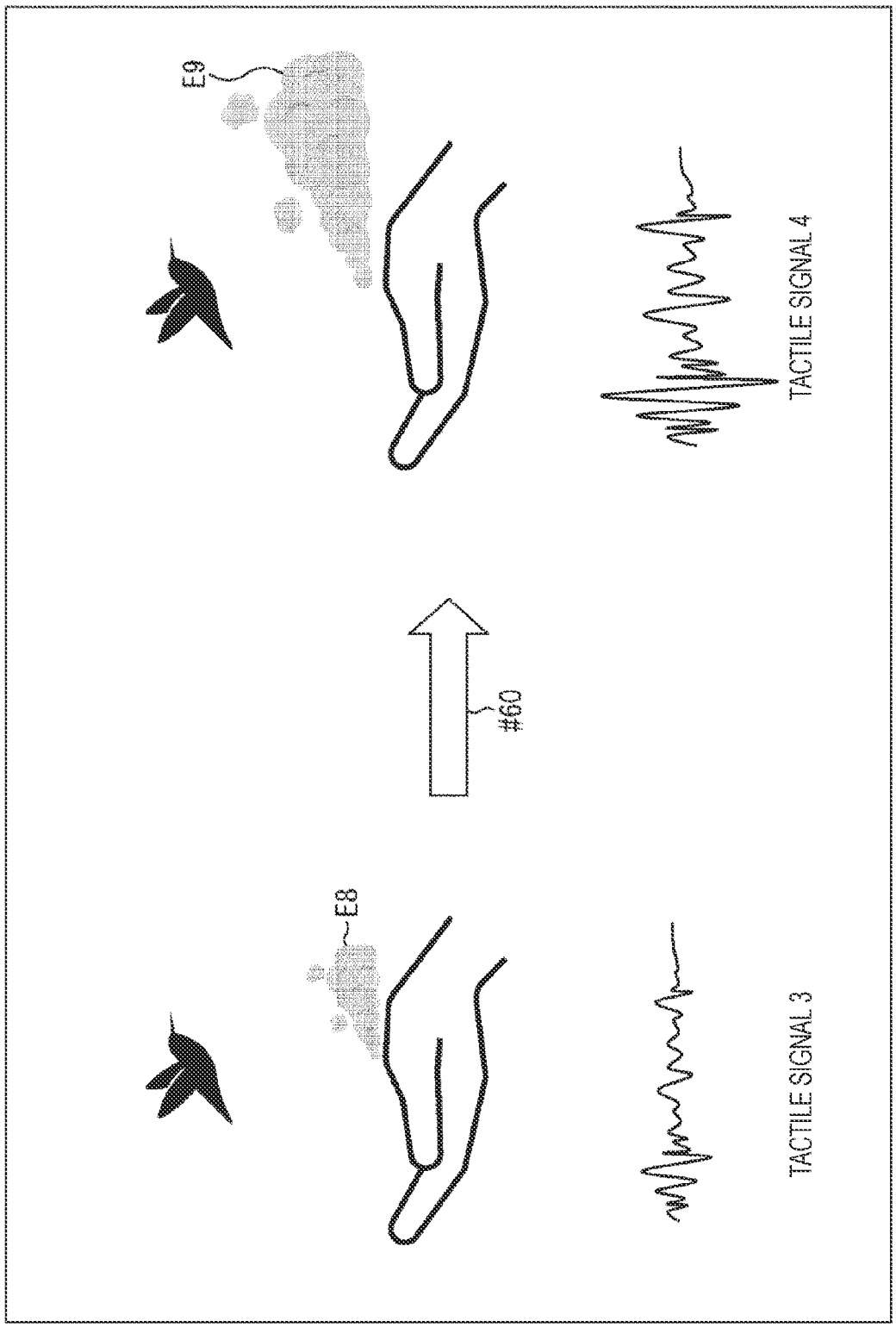
FIG. 17 is a diagram illustrating a fifth embodiment.

FIG. 17 is a diagram illustrating a display example of an effect image according to a fifth embodiment.

FIG. 17 illustrates a state in which an effect image having a three-dimensional shape is displayed.

In the example of FIG. 17, the virtual object O representing the bird performing an action of flapping its wings is displayed above the user's palm. The tactile presentation is performed from the tactile presentation device 200 to the user's hand on the basis of a tactile signal 3 corresponding to the movement of the virtual object O. Furthermore, according to the tactile presentation, an effect image E8 representing dust is displayed at a position below the virtual object O with reference to the user's hand. The effect image E8 is a three-dimensional effect image.

In a scene at the tip of arrow #60, tactile presentation is performed from the tactile presentation device 200 to the user's hand on the basis of a tactile signal 4 corresponding to the movement of the virtual object O. The tactile signal 4 is a signal with a larger amplitude than the tactile signal 3, so that a tactile sensation larger than a tactile sensation presented by the tactile signal 3 is presented.

Furthermore, the tactile presentation on the basis of the tactile signal 4 is larger than the tactile presentation on the basis of the tactile signal 3, so that an effect image E9 representing dust in the scene at the tip of arrow #60 is displayed as an effect image spread wider than the effect image E8.

As described above, as illustrated in FIG. 17, an effect image having a three-dimensional shape may be displayed as the effect image indicating the situation of the tactile presentation caused by the movement of the virtual object.

Sixth Embodiment

Figure 18:
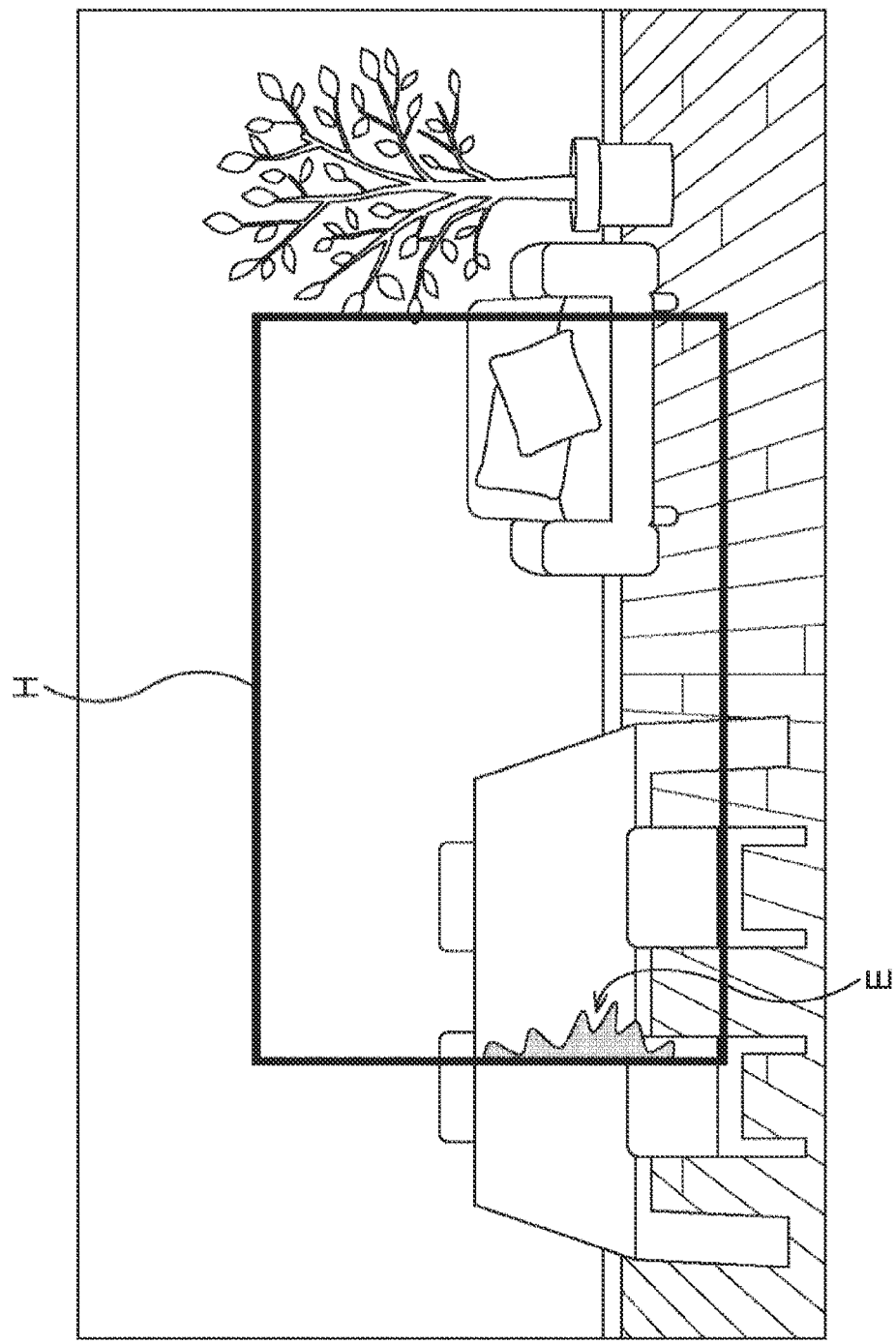
FIG. 18 is a diagram illustrating a sixth embodiment.

FIG. 18 is a diagram illustrating a display example of an effect image according to a sixth embodiment.

FIG. 18 illustrates a state in a case where the position of the tactile presentation is outside the display range of the display unit 142, and the effect image is displayed within the display range of the display unit 142. The position of a part of the user's body in the real space at which tactile presentation is performed is the position of the tactile presentation.

In the example of FIG. 18, the effect image E is displayed inside the display range H of the display unit 142. A rectangular frame indicated by a thick line indicates the display range H of the display unit 142.

The display position of the effect image E is determined on the basis of the positional relationship between the position of the tactile presentation and the display unit 142. In FIG. 18, tactile presentation is being performed on the left outside the display range H, and hence the effect image E is displayed at the left end of the display range H.

The effect represented by the effect image E may be any effect as long as the effect represents tactile presentation. In FIG. 18, the effect image E is displayed as a wavy display object. In addition, the effect image E may be an image in which a barb protrudes.

In a case where, for example, a palm and an object collide outside the display range of the display unit 142 and tactile presentation is being performed on the palm, an effect image representing the situation of the tactile presentation cannot be displayed. In such a case, by displaying the effect image within the display range of the display unit 142, the user can visually perceive the position of the vibration presentation and the state of the tactile presentation.

Furthermore, the display of the effect image E may be controlled according to the intensity or range of the tactile presentation. For example, in a case where the intensity of the tactile presentation is high, the wave of the effect image E can be enlarged or the color can be darkened. In a case where the range of the tactile presentation is wide, the display range of the effect image E may be enlarged and displayed.

As described above, as illustrated in FIG. 18, in a case where the position of the tactile presentation is outside the display range of the display unit 142, the effect image may be displayed within the display range of the display unit 142.

Modification 1

Figure 19:
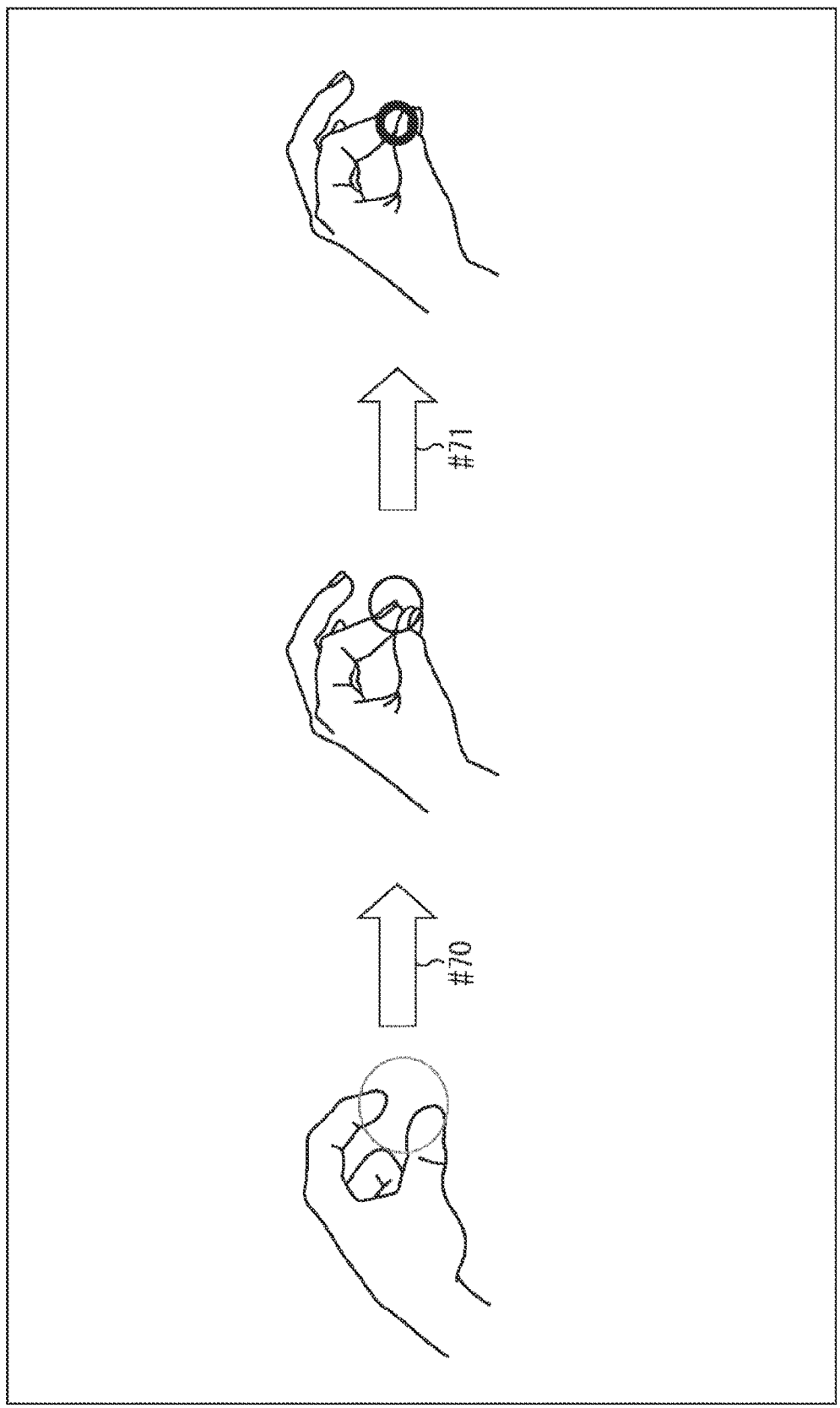
FIG. 19 is a diagram illustrating Modification 1.

FIG. 19 is a diagram illustrating Modification 1.

FIG. 19 illustrates a display example of the effect image E indicating the situation of the tactile presentation caused by the real object.

The example of FIG. 19 illustrates a state in a case where a pinching action is performed by the thumb and the index finger as the real object. At the left end of FIG. 19, an effect image E with a thickness and a size corresponding to the distance between the index finger and the thumb of the user is displayed. In this case, tactile presentation is not performed because there is a distance between the index finger and the thumb.

The tip of arrow #70 illustrates a state in which the thumb and the index finger perform the pinching action. With the index finger and the thumb in contact with each other, an effect image E with a smaller size and larger thickness than in the scene at the left end is displayed. Furthermore, pressure is applied in response to the contact between the index finger and the thumb, so that an effect image E with a changed color is displayed as the effect image E indicating tactile presentation.

For example, tactile presentation due to the pinching action is detected on the basis of pinching pressure and the contact area between the index finger and the thumb. The pinching pressure is detected by a pressure sensor, a myoelectric sensor, ultrasonic measurement through an index fingertip and a thumb tip, measurement of electric resistance values of the index fingertip and the thumb tip, or the like. The contact area is detected by measurement with a capacitive sensor. The larger the contact area, the larger the pressure value may be. In addition, in a case where a sensor that only performs contact determination by electrodes is used, the longer the contact time compared to a predetermined time set as a threshold, the larger the pressure value may be. Furthermore, tactile presentation may be performed from the tactile presentation device 200 according to the value of the detected tactile presentation. The tactile presentation in FIG. 19 is tactile presentation generated on the user's body by the fingers that are the real object.

The tip of arrow #71 illustrates an effect image E in a case where the index finger and the thumb are pressed more strongly than in the central scene. An effect image E with a smaller size and larger thickness is displayed because of the higher intensity of the tactile presentation due to the pinching action than in the central scene.

As described above, as illustrated in FIG. 19, an effect image indicating the situation of the tactile presentation caused by the real object may be displayed.

Modification 2

Figure 20:
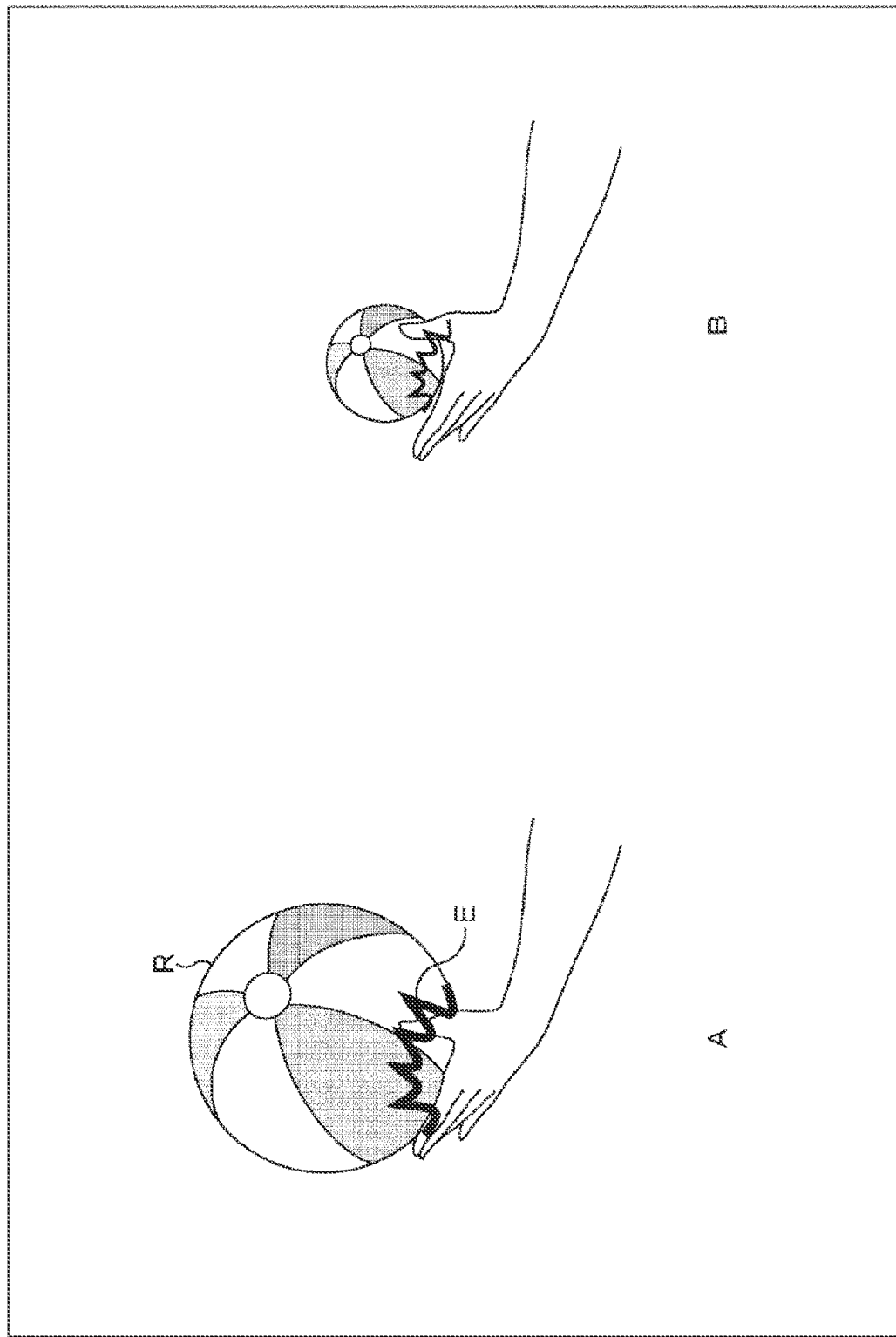
FIG. 20 is a diagram illustrating Modification 2.

FIG. 20 is a diagram illustrating Modification 2.

FIG. 20 illustrates a state in which an effect image indicating a situation of tactile presentation caused by a real object is displayed according to any of the dimensions or size of the real object, the intensity of the tactile presentation perceived by the user, and the situation of the user's operation.

The example of FIG. 20 illustrates a state in which the effect image E is displayed in response to flicking of a ball R as the real object from below by the hand As the effect image E, an image representing the impact is displayed at the contact position between the ball R and the hand.

The display of the effect image E is controlled according to the size and weight of the real object, for example. In FIG. 20, the size of the ball R that is the real object in scene A (left side in FIG. 20) is larger than the size in scene B (right side in FIG. 20). In this case, the intensity of the tactile presentation can be predicted to be higher in scene A than in scene B, so that the size of the effect image E may be displayed larger than that in scene B, as in scene A. Also, in a case where the weight of the real object in scene A is larger than that in scene B, the size of the effect image E may be displayed larger than that in scene B, as in scene A.

Furthermore, the display of the effect image E may be controlled according to the intensity of the tactile presentation perceived by the user. In this case, the intensity of the perceived tactile presentation is detected by a pressure sensor mounted on the tactile presentation device 200 worn by the user. Specifically, the display of the effect image E is controlled on the basis of the intensity of vibration when the ball R is flicked.

Furthermore, the display of the effect image E may be controlled according to the situation of the user's operation on the real object. The tactile presentation perceived by the user may be different depending on the wearing situation of the tactile presentation device 200 and the movement situation of the user's hand. For example, the magnitude of vibration perceived while performing a movement such as moving the hand is smaller than the actual magnitude of vibration. Thus, the effect image E may be deformed on the basis of the intensity of vibration actually perceived by the user, which is detected by the pressure sensor mounted on the tactile presentation device 200.

In a case where the upper limit of presentable intensity is reached in the tactile presentation, instead of increasing the intensity, the size of the effect image may be enlarged or the volume of the sound information to be presented may be raised, thereby creating the illusion of a higher perceived intensity of the tactile presentation.

As described above, as illustrated in FIG. 20, the display of the effect image may be controlled according to any of the dimensions or size of the real object, the intensity of the tactile presentation perceived by the user, and the situation of the user's operation.

Modification 3

Figure 21:
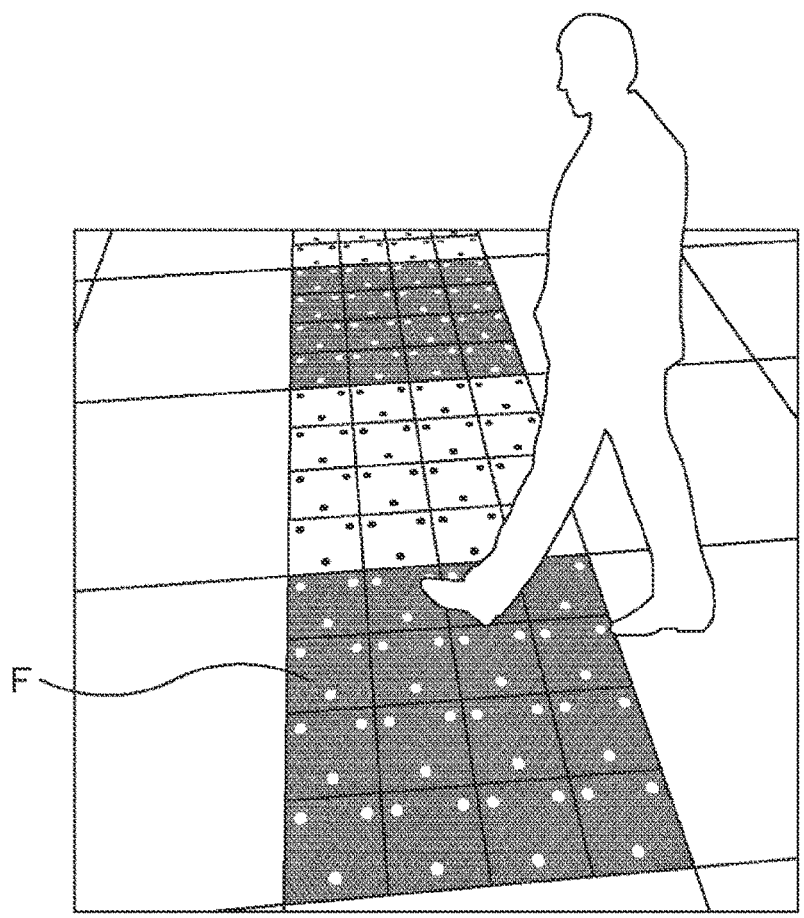
FIG. 21 is a diagram illustrating Modification 3.
Figure 22:
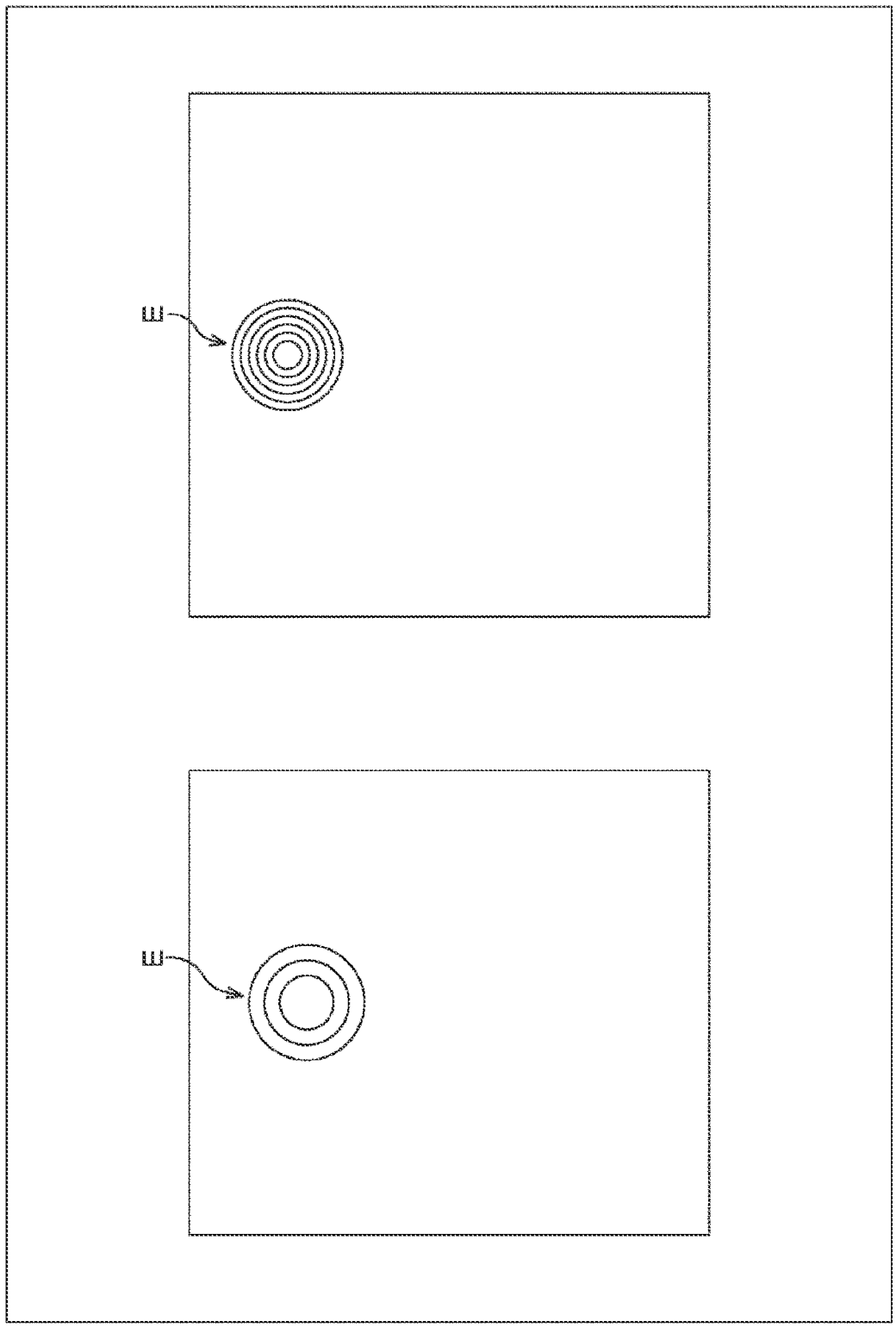
FIG. 22 is a diagram illustrating Modification 4.

FIGS. 21 and 22 are diagrams illustrating Modification 3.

FIGS. 21 and 22 illustrate another example of the effect image corresponding to the situation of the tactile presentation caused by the real object.

FIG. 21 illustrates a state in which a display F equipped with a pressure-sensitive sensor is installed on the floor, and the user is stepping on a part of the display F with his or her right foot. The pressure-sensitive sensor can measure a pressure value when the user's foot, which is a real object, steps on the display F.

FIG. 22 illustrates a state in which an effect image corresponding to a pressure value is displayed on the display F installed on the floor. As illustrated in FIG. 22, a rippled effect image E is displayed with reference to the position stepped on by the user. Furthermore, the effect image can be deformed according to the pressure value. The right side of FIG. 22 illustrates the effect image E in a case where the pressure value is larger than that in the case on the left side of FIG. 22. The larger the pressure value, the more ripples are displayed in the effect image E.

Furthermore, the effect image may be deformed according to the distance between the real object and the display and the pressure value at the time of operation on the display.

As the type of effect image, a color (color density, etc.), a shape (not only a circular shape, but also a polygonal shape, etc.), a size (ripple diameter, line thickness, etc.), or line-to-line spacing, or the like may be changed.

The display of the effect image may be realized by a mobile device such as a smartphone or a tablet, a face-to-face display including a touch display, or a device having a display equipped with a pressure-sensitive sensor such as a floor panel type tactile presentation device.

Figure 23:
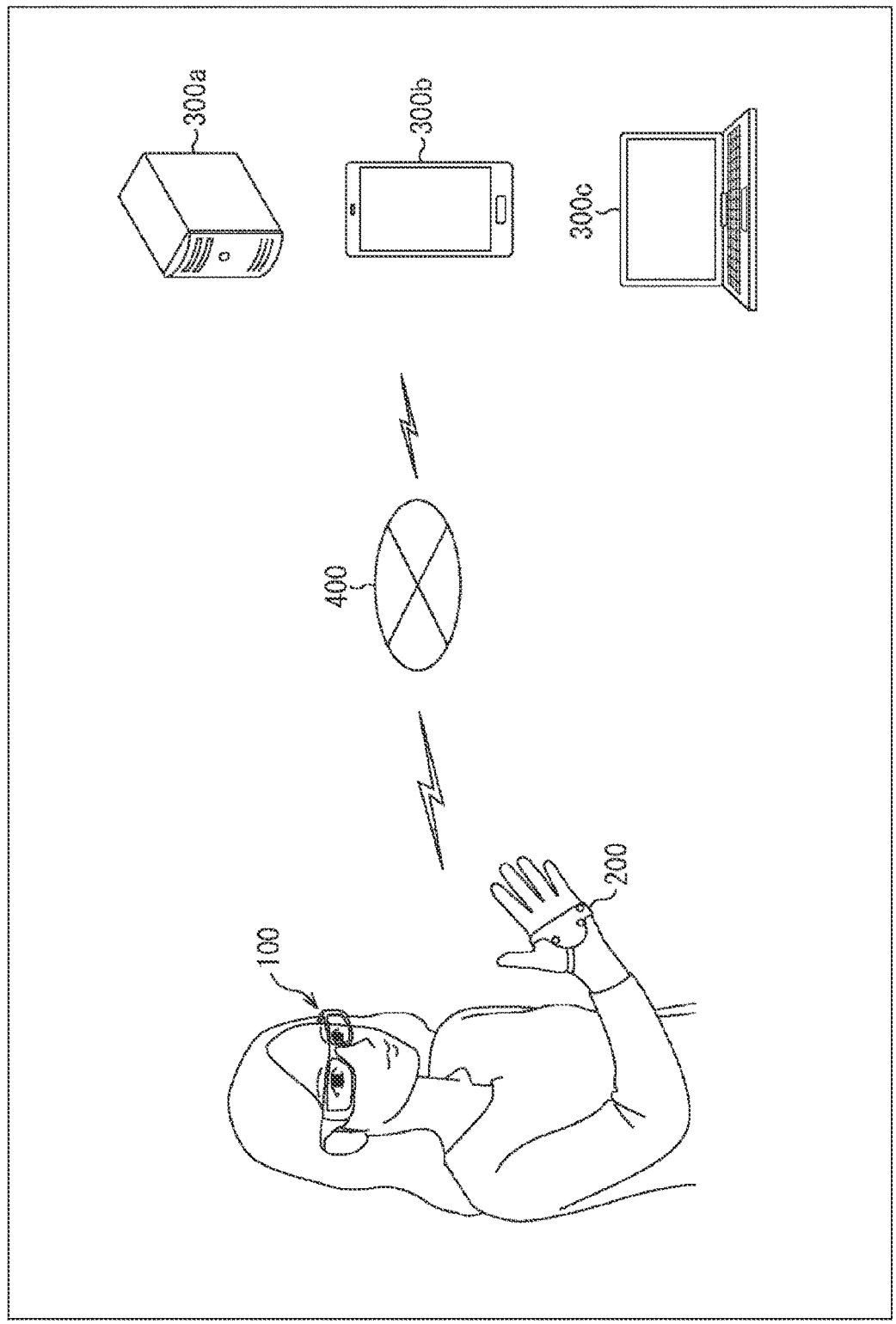
FIG. 23 is a diagram illustrating another configuration example of the information processing system according to one embodiment of the present technology.

Another Configuration Example of Information Processing System According to One Embodiment FIG. 23 is a diagram illustrating another configuration example of the information processing system according to one embodiment of the present technology. Description overlapping with FIG. 1 will be omitted as appropriate.

In the information processing system of FIG. 23, an external server 300a, a smartphone 300b, and a personal computer (PC) 300c are illustrated as other examples of the information processing apparatus 300 in the information processing system of FIG. 1. The processing related to the information processing apparatus 300 may be performed by an information processing apparatus such as the external server 300a, the smartphone 300b, or the PC 300c.

Another Configuration Example of Each Apparatus

Figure 24:
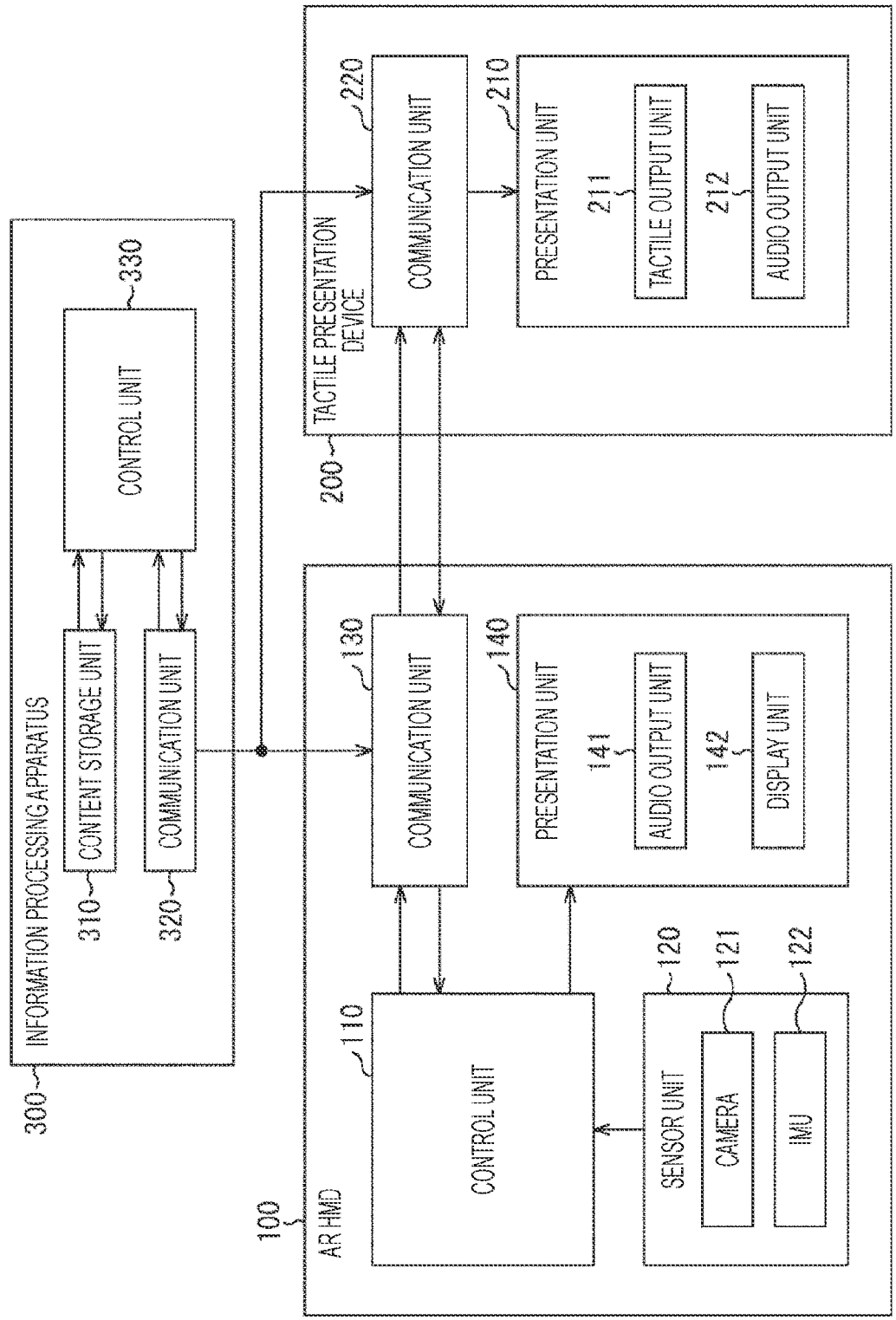
FIG. 24 is a diagram illustrating another configuration example of each apparatus device.

FIG. 24 is a block diagram illustrating another functional configuration example of each apparatus. Description overlapping with FIG. 7 will be omitted as appropriate.

The configuration illustrated in FIG. 24 is different from the configuration illustrated in FIG. 7 mainly in that a control unit 330 is provided in the information processing apparatus 300. Each processing described as the processing performed by the control unit 110 of the AR HMD 100 may be performed by the control unit 330 of the information processing apparatus 300.

In this case, in the control unit 330 of the information processing apparatus 300, the sensor information acquisition unit 111, the sensor information processing unit 112, the display control unit 113, the tactile signal generation unit 114, and the audio output control unit 115 in FIG. 7 are realized. Processing similar to the processing in each processing unit is performed in the control unit 330 of the information processing apparatus 300.

Configuration Example of Computer

Figure 25:
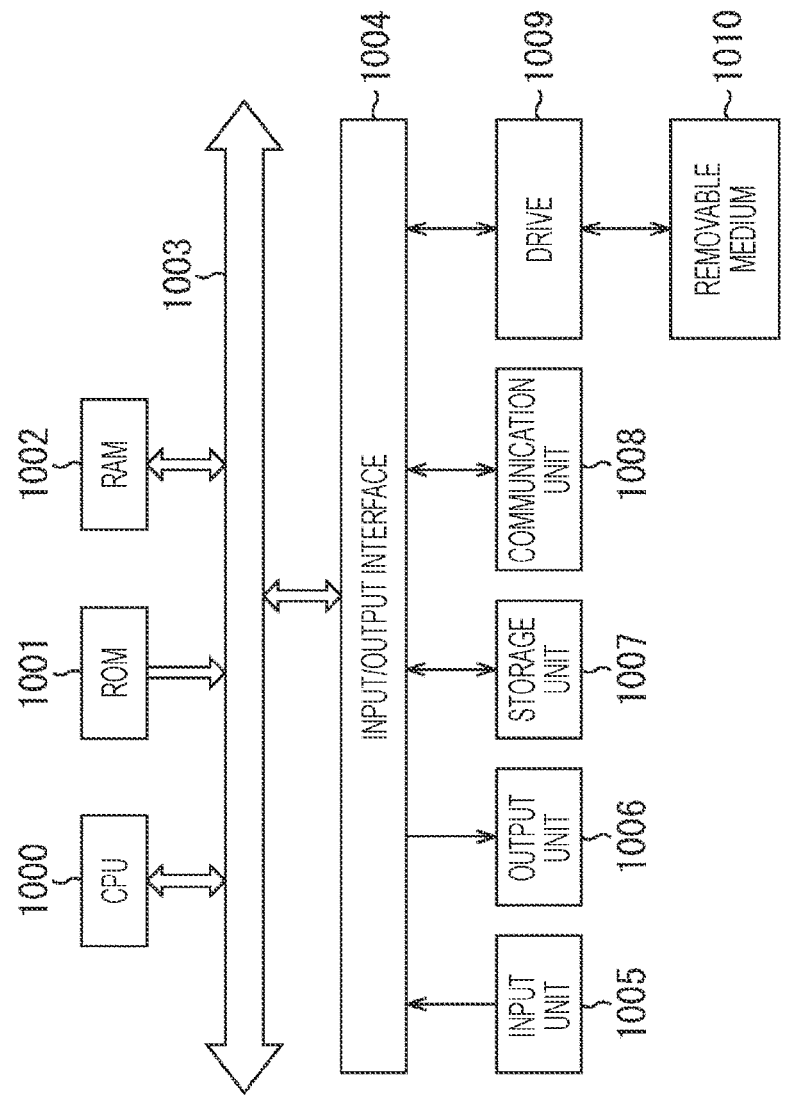
FIG. 25 is a block diagram illustrating another configuration example of the information processing system.

FIG. 25 is a block diagram illustrating a configuration example of a computer.

A series of the processing described above can be executed by hardware, or may be executed by software. In a case where the series of processing is executed by software, a program constituting the software is installed to a computer incorporated in dedicated hardware, a general-purpose personal computer, or the like.

The program to be installed is provided by being recorded in a removable medium 1010 illustrated in FIG. 25 including an optical disk (a compact disc-read only memory (CD-ROM), a digital versatile disc (DVD), etc.), a semiconductor memory, or the like. Furthermore, the program may be provided via a wired or wireless transmission medium such as a local area network, the Internet, or digital broadcasting. The program can be installed in a ROM 1001 or a storage unit 1007 in advance.

Note that the program executed by the computer may be a program for processing in time series in the order described in the present description, or a program for processing in parallel or at a necessary timing such as when a call is made.

In the present specification, a system is intended to mean assembly of a plurality of components (apparatuses, modules (parts), etc.) and it does not matter whether or not all the components are in the same housing. Therefore, a plurality of apparatuses housed in separate housings and connected via a network and a single apparatus in which a plurality of modules is housed in one housing are both systems.

Note that the effects described in the present specification are merely examples and are not limited, and there may be other effects.

The embodiment of the present technology is not limited to the embodiments described above, and various modifications can be made without departing from the scope of the present technology.

For example, the present technology may be configured as cloud computing in which one function is shared by a plurality of apparatuses via the network to process together.

Furthermore, each of the steps in the flowcharts described above can be executed by one apparatus or executed by a plurality of apparatuses in a shared manner.

Moreover, in a case where a plurality of processing is included in one step, the plurality of processing included in one step can be executed by one apparatus or by a plurality of apparatuses in a shared manner.

Combination Examples of Configurations

The present technology can also be configured as follows:

(1)

An information processing apparatus including
a control unit that acquires information regarding a situation of tactile presentation to at least a part of a body of a user, and generates an effect image corresponding to the situation of the tactile presentation.

(2)

The information processing apparatus according to (1) above, in which
the control unit generates the effect image on the basis of information regarding a situation of the tactile presentation caused by a virtual object observed by the user via a display unit.

(3)

The information processing apparatus according to (1) above, in which
the control unit generates an effect image indicating a situation of the tactile presentation in response to the virtual object coming into contact with at least a part of the body of the user.

(4)

The information processing apparatus according to (1) above, in which
the control unit generates the effect image on the basis of information regarding a situation of the tactile presentation determined by movement of the virtual object.

(5)

The information processing apparatus according to (4) above, in which
the control unit generates the effect image on the basis of information regarding a situation of the tactile presentation determined in accordance with a degree of the movement of the virtual object.

(6)

The information processing apparatus according to (2) above, in which
the control unit acquires first position information indicating a position of at least a part of the body of the user determined on the basis of sensing information, and second position information of the virtual object, and
the control unit determines a display position of the effect image on the basis of the first position information and the second position information.

(7)

The information processing apparatus according to (6) above, in which
the control unit determines a display position of the effect image at a position with reference to at least a part of the body of the user on the basis of the first position information and the second position information.

(8)

The information processing apparatus according to (2) above, in which
the control unit determines a pressure value for at least a part of the body of the user caused by the virtual object, and
the control unit controls display of an effect image indicating a situation of the tactile presentation on the basis of the pressure value.

(9)

The information processing apparatus according to (8) above, in which
the control unit determines a virtual movement amount of at least a part of the body on the basis of the pressure value, and
the control unit controls display of a complementary image representing at least the part of the body on the basis of the virtual movement amount.

(10)

The information processing apparatus according to (8) above, in which
the control unit calculates the pressure value on the basis of at least one of weight information of the virtual object or movement of the virtual object.

(11)

The information processing apparatus according to (2) above, in which
the control unit generates the effect image on the basis of information regarding a situation of the tactile presentation caused by the virtual object related to a real object operated by at least a part of the body of the user.

(12)

The information processing apparatus according to (2) above, in which
the control unit displays an effect image at a position with reference to a position of one or more of the virtual objects that generate the tactile presentation among a plurality of the virtual objects.

(13)

The information processing apparatus according to (12) above, in which
the control unit controls display of an effect image in accordance with a degree to which each of one or more of the virtual objects that generate the tactile presentation generates the tactile presentation (14)

The information processing apparatus according to (2) above, in which
the control unit generates the effect image that is an image having a three-dimensional shape.

(15)

The information processing apparatus according to (2) above, in which
the control unit displays the effect image within a range of a display viewing angle of the display unit in accordance with a position of the display unit and a position of the tactile presentation in a case where the position of the tactile presentation is outside the range of the display viewing angle of the display unit.

(16)

The information processing apparatus according to any one of (1) to (15) above, in which
the control unit generates the effect image on the basis of information regarding a situation of the tactile presentation caused by a real object.

(17)

The information processing apparatus according to (16) above, in which
the control unit generates the effect image on the basis of a degree of the tactile presentation determined in accordance with a weight or a size of the real object.

(18)

The information processing apparatus according to any one of (1) to (17) above, in which
the control unit changes at least one of a size, transmittance, luminance, brightness, or color of the effect image on the basis of information regarding a situation of the tactile presentation.

(19)

An information processing method including:
acquiring, by an information processing apparatus, information regarding a situation of tactile presentation presented to a part of a body of a user; and
generating, by the information processing apparatus, an effect image indicating the situation of the tactile presentation.

(20)

A program for causing a computer to execute:
acquiring information regarding a situation of tactile presentation presented to a part of a body of a user;
generating an effect image indicating the situation of the tactile presentation.

REFERENCE SIGNS LIST

100 AR HMD
200 tactile presentation device
E Effect image
O Virtual object
110 Control unit
111 Sensor information acquisition unit
112 Sensor information processing unit
113 Display control unit
113a Virtual object display control unit
87 Estimation unit
113b Effect image display control unit
114 Tactile signal generation unit

The invention claimed is:

1. An information processing apparatus comprising
a control unit that acquires configured to
acquire information regarding a situation of tactile presentation to at least one part of a body of a user, and
generate an effect image corresponding to the situation of the tactile presentation,
wherein the control unit generates the effect image by changing at least one of a line thickness or a density of the effect image based on the information regarding the situation of the tactile presentation,
wherein the control unit generates the effect image based on the information regarding the situation of the tactile presentation caused by a virtual object observed by the user via a display unit,
wherein the control unit is further configured to display the effect image within a range of a display viewing angle of the display unit in accordance with a position of the display unit and a position of the tactile presentation in a case where the position of the tactile presentation is outside the range of the display viewing angle of the display unit, and
wherein the control unit is implemented via at least one processor.

2. The information processing apparatus according to claim 1, wherein
the control unit generates the effect image indicating the situation of the tactile presentation in response to the virtual object coming into contact with the at least one part of the body of the user.

3. The information processing apparatus according to claim 1, wherein
the control unit generates the effect image based on the information regarding the situation of the tactile presentation determined by movement of the virtual object.

4. The information processing apparatus according to claim 3, wherein
the control unit generates the effect image based on the information regarding the situation of the tactile presentation determined in accordance with a degree of the movement of the virtual object.

5. The information processing apparatus according to claim 1, wherein
the control unit acquires first position information indicating a position of the at least one part of the body of the user determined based on sensing information, and second position information of the virtual object, and
the control unit determines a display position of the effect image based on the first position information and the second position information.

6. The information processing apparatus according to claim 5, wherein
the control unit determines a display position of the effect image at a position with reference to the at least one part the body of the user based on the first position information and the second position information.

7. The information processing apparatus according to claim 1, wherein
the control unit determines a pressure value for the at least one part the body of the user caused by the virtual object, and
the control unit controls display of the effect image indicating the situation of the tactile presentation based on the pressure value.

8. The information processing apparatus according to claim 7, wherein
the control unit determines a virtual movement amount of the at least one part the body based on the pressure value, and
the control unit controls display of a complementary image representing at least the part of the body based on the virtual movement amount.

9. The information processing apparatus according to claim 7, wherein
the control unit calculates the pressure value based on at least one of weight information of the virtual object or movement of the virtual object.

10. The information processing apparatus according to claim 1, wherein
the control unit generates the effect image based on the information regarding the situation of the tactile presentation caused by the virtual object related to a real object operated by the at least one part the body of the user.

11. The information processing apparatus according to claim 1, wherein
the control unit is further configured to display the effect image at a position with reference to a position of one or more of the virtual objects that generate the tactile presentation among a plurality of the virtual objects.

12. The information processing apparatus according to claim 11, wherein
the control unit controls display of the effect image in accordance with a degree to which each of one or more of the plurality of virtual objects that generate the tactile presentation generates the tactile presentation.

13. The information processing apparatus according to claim 1, wherein
the control unit generates the effect image including an image having a three-dimensional shape.

14. The information processing apparatus according to claim 1, wherein
the control unit generates the effect image based on the information regarding the situation of the tactile presentation caused by a real object.

15. The information processing apparatus according to claim 14, wherein
the control unit generates the effect image based on a degree of the tactile presentation determined in accordance with a weight or a size of the real object.

16. The information processing apparatus according to claim 1, wherein
the control unit generates the effect image by changing at least one of a size, transmittance, luminance, brightness, or color of the effect image based on the information regarding the situation of the tactile presentation.

17. An information processing method comprising:
acquiring, by an information processing apparatus, information regarding a situation of tactile presentation presented to a part of a body of a user; and
generating, by the information processing apparatus, an effect image indicating the situation of the tactile presentation,
wherein the effect image is generated by changing at least one of a line thickness or a density of the effect image based on the information regarding the situation of the tactile presentation,
wherein the effect image is generated based on the information regarding the situation of the tactile presentation caused by a virtual object observed by the user via a display unit, and
wherein the method further comprises displaying the effect image within a range of a display viewing angle of the display unit in accordance with a position of the display unit and a position of the tactile presentation in a case where the position of the tactile presentation is outside the range of the display viewing angle of the display unit.

18. A non-transitory computer-readable storage medium having embodied thereon a program which when executed by a computer, causes the compute to execute a method, the method comprising:
acquiring information regarding a situation of tactile presentation presented to a part of a body of a user;
generating an effect image indicating the situation of the tactile presentation,
wherein the effect image is generated by changing at least one of a line thickness or a density of the effect image based on the information regarding the situation of the tactile presentation,
wherein the effect image is generated based on the information regarding the situation of the tactile presentation caused by a virtual object observed by the user via a display unit, and
wherein the method further comprises displaying the effect image within a range of a display viewing angle of the display unit in accordance with a position of the display unit and a position of the tactile presentation in a case where the position of the tactile presentation is outside the range of the display viewing angle of the display unit.

* * * * *